(12) United States Patent
Tanaka et al.

(10) Patent No.: US 12,210,781 B2
(45) Date of Patent: Jan. 28, 2025

(54) STORAGE DEVICE AND PROTOCOL CONVERSION METHOD BY STORAGE DEVICE

(71) Applicant: Hitachi, Ltd., Tokyo (JP)

(72) Inventors: Katsuya Tanaka, Tokyo (JP); Yutaro Kobayashi, Tokyo (JP); Hideaki Fukuda, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 55 days.

(21) Appl. No.: 17/947,811

(22) Filed: Sep. 19, 2022

(65) Prior Publication Data

US 2023/0315345 A1  Oct. 5, 2023

(30) Foreign Application Priority Data

Mar. 31, 2022  (JP) ................................. 2022-060208

(51) Int. Cl.
G06F 3/06 (2006.01)
H04L 67/1097 (2022.01)
(52) U.S. Cl.
CPC ........ G06F 3/0683 (2013.01); H04L 67/1097 (2013.01)
(58) Field of Classification Search
CPC ............................ G06F 3/0683; H04L 67/1097
See application file for complete search history.

(56) References Cited

U.S. PATENT DOCUMENTS 6,742,075 B1  5/2004 Bailey et al.
11,347,672 B2  5/2022 Tanaka et al.
2010/0281201 A1*  11/2010 O'Brien ............. G06F 13/4027
    710/308
2019/0297015 A1*  9/2019 Marolia ................. H04L 45/60
2019/0342199 A1*  11/2019 Hurson ............... H04L 43/0882
2020/0004463 A1  1/2020 Kobayashi et al.
2020/0314181 A1*  10/2020 Eran ....................... H04L 67/10
2020/0319812 A1*  10/2020 He .......................... G06F 3/0629
2020/0326879 A1*  10/2020 Zhang ................. G06F 12/0246
2021/0342287 A1*  11/2021 Lai ....................... G06F 13/4282
2021/0365397 A1  11/2021 Tanaka et al.
2022/0303217 A1*  9/2022 Liu ......................... H04L 47/11

FOREIGN PATENT DOCUMENTS

JP    2019-204463 A    11/2019
JP    2021-189462 A    12/2021
WO   WO-2015/008354 A1  1/2015

OTHER PUBLICATIONS

Japanese Office Action issued in corresponding JP Application No. 2022-060208, dated Nov. 26, 2024 with English translation (12 pages).

* cited by examiner

Primary Examiner — Eric T Oberly
(74) Attorney, Agent, or Firm — Foley & Lardner LLP

(57) ABSTRACT

A storage apparatus includes a plurality of storage controllers. Each of the plurality of storage controllers includes a controller interface for connecting the storage controllers. The controller interface includes one or more logical ports corresponding to each storage controller of the connection destination. When converting the first request of the first protocol used in the storage controller into the second request of the second protocol used in the inter-storage controller network, the controller interface stores the identification information of the first request and the identification information of the second request in the send queue of the logical port.

12 Claims, 27 Drawing Sheets

FIG. 5

| # | Address Range | Destination QPN | Source QPN | QP Address |
|---|---|---|---|---|
| 1 | | | | |
| 2 | | | | |
| 3 | | | | |
| ... | ... | ... | ... | ... |

500
501 — Address Range
502 — Destination QPN
503 — Source QPN
504 — QP Address

RDMA Read Request

1201 BTH  1202 RETH  1203 ICRC

RDMA Read Response (First/Last/Only)

1301 BTH  1302 AETH  1303 Payload  1304 ICRC

RDMA Read Response (Middle)

1401 BTH  1402 Payload  1403 ICRC

FIG. 15

| bits | 31 | ... | 24 | 23 | ... | 16 | 15 | ... | 8 | 7 | ... | 0 |
|---|---|---|---|---|---|---|---|---|---|---|---|---|
| bytes | +0 | | | | +1 | | | +2 | | | +3 | |
| 0-3 | OpCode | | | Destination QP | | | | | | | | |
| 4-7 | A | E | CS | | | | PSN | | | LastBE | | lstBE |

BTH

1501 OpCode
1505 A
1506 E
1507 CS
1502 Destination QP
1508 PSN
1503 LastBE
1504 lstBE

| bits | 31 | ... | 24 | 23 | ... | 16 | 15 | ... | 8 | 7 | ... | 0 |
|---|---|---|---|---|---|---|---|---|---|---|---|---|
| bytes | +0 | | | | +1 | | | +2 | | | +3 | |
| 0-3 | Remote Address [63-32] | | | | | | | | | | | |
| 4-7 | Remote Address [31-2] | | | | | | | | | | | R |
| 8-11 | DMA Length | | | | | | | | | | | |

RETH

1601 Remote Address [63-32]
1602 Remote Address [31-2]
1603 DMA Length

| # | PCIe Header | RoCE RDMA Header | |
|---|---|---|---|
| 1 | Type (Memory Write) | OpCode (RDMA Write Only) | BTH |
| 2 | 1st Byte Enable | SAME AS LEFT | |
| 3 | Last Byte Enable | SAME AS LEFT | |
| 4 | Error Poisoned | SAME AS LEFT | |
| 5 | Requester ID + Tag | STORE IN WQE (ONLY Requester) | |
| 6 | PCIe Address [63:32] | SAME AS LEFT | RETH |
| 7 | PCIe Address [31:2] | SAME AS LEFT | |
| 8 | Length | DMA Length | |

| # | QPN | PSN | RequesterID+Tag |
|---|-----|-----|-----------------|
| 1 |     |     |                 |
| 2 |     |     |                 |
| 3 |     |     |                 |
| ⋮ | ⋮ | ⋮ | ⋮ |

FIG. 26

| # | PCIe Header | RoCE RDMA Header | |
|---|---|---|---|
| 1 | Type (Memory Read) | OpCode (RDMA Read) | BTH |
| 2 | 1st Byte Enable | SAME AS LEFT | BTH |
| 3 | Last Byte Enable | SAME AS LEFT | BTH |
| 4 | Error Poisoned | SAME AS LEFT | BTH |
| 5 | Requester ID + Tag | ·STORE IN WQE (Requester)<br>·STORE IN PSN-PCIe Tag CONVERSION TABLE (Responder) | |
| 6 | PCIe Address [63:32] | SAME AS LEFT | RETH |
| 7 | PCIe Address [31:2] | SAME AS LEFT | RETH |
| 8 | Length | DMA Length | RETH |

2601 — PCIe Header
2602 — RoCE RDMA Header
2603 — row 1
2604 — row 2
2605 — row 3
2606 — row 4
2607 — row 5
2608 — row 6
2609 — row 7
2610 — row 8

FIG. 28

| # | PCIe Header 2801 | RoCE RDMA Header (BTH) 2802 |
|---|---|---|
| 1 | Type (Completion) | OpCode (RDMA Read Response) |
| 2 | Length | N/A |
| 3 | Completion Status | CS |
| 4 | Byte Count | N/A |
| 5 | Requester ID + Tag | QPN, PSN |
| 6 | Lower Address | N/A |

| # | RoCE RDMA Header (BTH) | PCIe Header |
|---|---|---|
| 1 | OpCode (RDMA Read Response) | Type (Completion) |
| 2 | N/A (CONVERSION FROM PSN OF RETH AND DMA Length IN WQE) | Length |
| 3 | CS | Completion Status |
| 4 | N/A (CONVERSION FROM PSN OF RETH AND DMA Length IN WQE) | Byte Count |
| 5 | PSN | Requester ID + Tag |
| 6 | N/A (CONVERSION FROM 1stBE OF BTH, Remote Address OF RETH, AND RECEIVED DATA SIZE IN WQE) | Lower Address |

| # | Requester ID | Data Transfer Type |
|---|---|---|
| 1 |  |  |
| 2 |  |  |
| 3 |  |  |
| ⋮ | ⋮ | ⋮ |

STORAGE DEVICE AND PROTOCOL CONVERSION METHOD BY STORAGE DEVICE

CLAIM OF PRIORITY

The present application claims priority from Japanese patent application JP 2022-060208 filed on Mar. 31, 2022, the content of which is hereby incorporated by reference into this application.

BACKGROUND OF THE INVENTION

1. Field of the Invention

The present invention relates to a storage apparatus in which a plurality of storage controllers communicate via a network.

2. Description of the Related Art

In a storage apparatus having a cluster configuration in which a plurality of storage nodes are gathered, high data access performance by parallel access can be realized by operating the storage nodes in parallel, and high availability by redundancy of data can be realized. Then, a large-scale storage apparatus can be configured by interconnecting the plurality of storage nodes by a network. For example, JP 2019-204463 A discloses a storage apparatus that achieves high functionality and high performance of the storage apparatus by connecting a plurality of storage controllers with an interface using a proprietary protocol based on PCIe (Peripheral Component Interconnect Express).

In the following description and the drawings, an internal network of a storage apparatus to which a plurality of storage nodes is connected will be referred to as a storage internal network. The storage internal network may be simply referred to as an internal network, and the storage node may be simply referred to as a node.

The storage node generally includes a storage controller and a random accessible non-volatile storage medium. This storage medium is, for example, a drive box including a large number of nonvolatile semiconductor memory drives and hard disk drives. The storage controller includes a front-end interface for connecting a host device (such as a host system), a back-end interface for connecting a drive box, and a cache memory for temporarily storing user data read from and written to the drive box by the host device.

Further, the storage controller includes a control memory that stores control data handled in the storage controller, and a processor that controls data transfer of the user data and the control data. In a storage apparatus in which a plurality of storage nodes are connected, the plurality of storage nodes send and receive user data and control data between nodes via a storage internal network.

For example, Ethernet is known as a network standard suitable for connection between computer nodes including storage nodes. As a protocol that enables data transfer by remote direct memory access (RDMA) over Ethernet, for example, RDMA over Ethernet (RoCE) is known.

SUMMARY OF THE INVENTION

For example, it is possible to improve the performance of the storage apparatus by connecting the storage controllers to each other by the Ethernet-based RoCE having a higher transfer speed than PCIe. However, in a conventional storage apparatus such as the storage apparatus of JP 2019-204463 A, high functionality and high performance are realized by applying a PCIe-based proprietary protocol to connection between storage controllers. Therefore, a general RoCE interface cannot realize all the functions for storage, and it is difficult to replace the conventional PCIe-based controller interface.

An object of one embodiment of the present invention is to provide a method for converting packets between two protocols suitable for a storage controller interface, such as PCIe and RoCE, and a storage apparatus using the method.

A storage apparatus according to an aspect of the present invention includes a plurality of storage controllers, in which each of the plurality of storage controllers includes a controller interface for connecting the storage controllers, and the controller interface includes one or more logical ports corresponding to each storage controller of a connection destination. When converting the first request of the first protocol used in the storage controller into the second request of the second protocol used in the inter-storage controller network, the controller interface stores the identification information of the first request and the identification information of the second request in the send queue of the logical port.

According to one aspect of the present invention, the controller interface of the storage apparatus can perform appropriate protocol conversion.

BRIEF DESCRIPTION OF THE DRAWINGS

FIG. 5 is a diagram for explaining an address-QP number conversion table;
FIG. 15 is a diagram for explaining a format of a BTH;
FIG. 16 is a diagram for explaining a format of a RETH.

FIG. 22 is a diagram for explaining conversion processing between a PCIe Write request header and an RDMA Write request header;

FIG. 26 is a diagram for explaining conversion processing between a PCIe Read request header and an RDMA Read request header;

FIG. 28 is a diagram for explaining conversion processing between a PCIe completion header and a header of an RDMA Read response;

FIG. 29 is a diagram for explaining conversion processing between a header of an RDMA Read response and a PCIe completion header;

DESCRIPTION OF THE PREFERRED EMBODIMENTS

Figure 1:
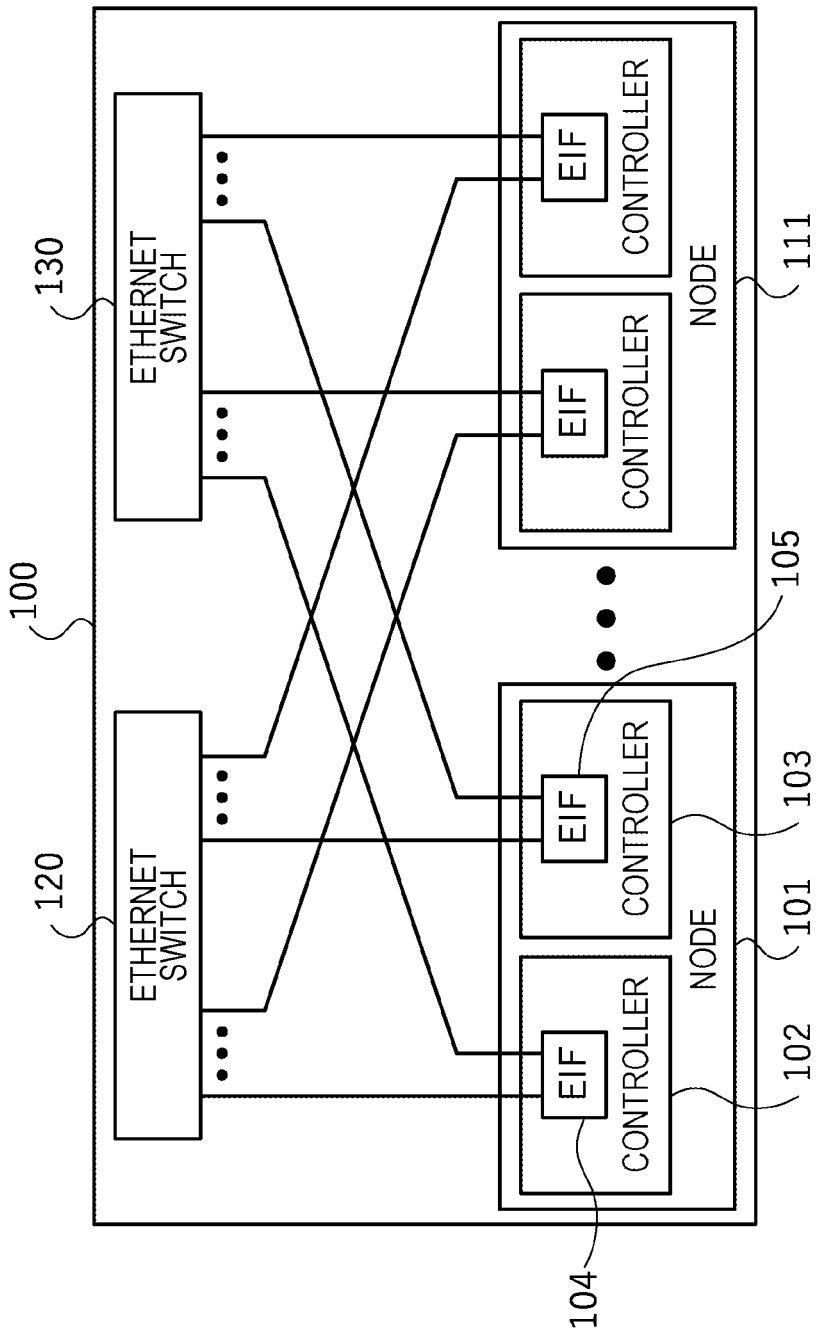
FIG. 1 is a diagram for explaining a storage apparatus according to a first embodiment.

Hereinafter, some embodiments of the invention will be described with reference to the drawings. Components denoted by the same reference numerals are assumed to be substantially the same throughout all the embodiments. Since the processing executed by a processor is appropriately performed using a storage resource (for example, a memory) and a communication interface device (for example, a communication port), the subject of the processing may be the processor. The processor may include dedicated hardware in addition to a central processing unit (CPU).

First Embodiment

A storage apparatus according to a first embodiment will be described with reference to FIGS. 1 to 29. FIG. 1 is a diagram for explaining a hardware configuration of the storage apparatus according to the first embodiment. A storage apparatus 100 of the first embodiment includes a plurality of storage nodes including storage nodes 101 and 111 interconnected by an internal network. Although two storage nodes are illustrated in FIG. 1, the number of storage nodes connected to the internal network is arbitrary. This internal network is referred to as a storage internal network in the present specification.

In the storage apparatus 100 according to the first embodiment, for example, a network constructed by switches or links of the Ethernet (registered trademark) standard is used as the storage internal network. The storage nodes 101 and 111 are interconnected via Ethernet switches 120 and 130. The number of Ethernet switches is arbitrary, and switches and links of protocols different from the Ethernet may be used.

The storage node 101 includes two storage controllers 102 and 103 therein. The storage controller 102 has an edge interface (EIF) 104 for connection with the Ethernet switches 120 and 130. Similarly, the storage controller 103 has an edge interface (EIF) 105 for connection with the Ethernet switches 120 and 130. The edge interface is a controller interface. The storage node 111 has a configuration similar to that of the storage node 101. The number of storage controllers in the storage node is arbitrary. Different storage controllers may have different configurations.

Figure 2:
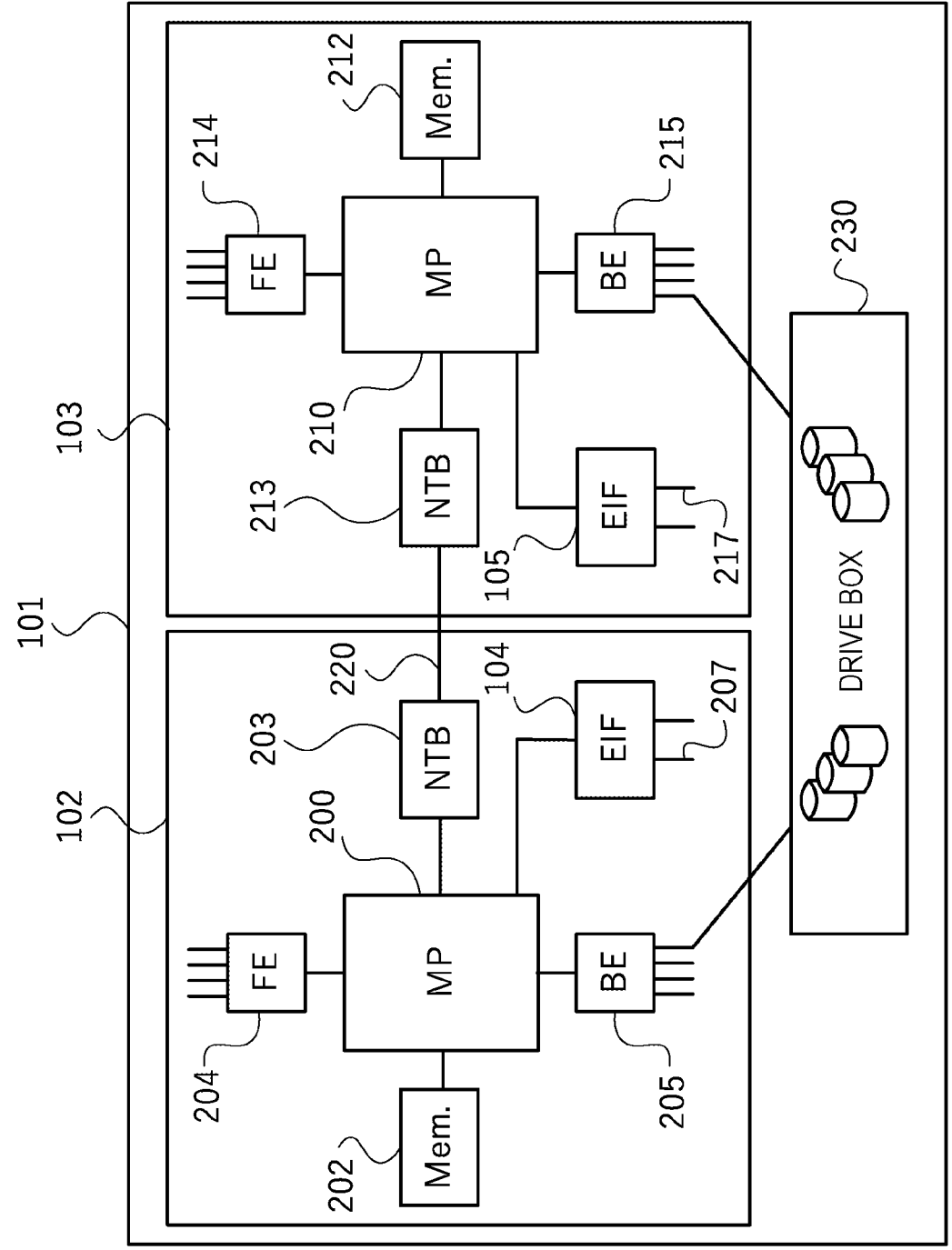
FIG. 2 is a diagram for explaining a storage node.

FIG. 2 is a diagram for explaining a hardware configuration of the storage node according to the first embodiment. The storage node 101 includes the storage controllers 102 and 103 and the drive box 230 having a plurality of hard disk drives (HDD) or a plurality of solid state drives (SSD).

The storage controller 102 includes a processor (MP) 200, a memory 202, a front-end interface (FE) 204, and a back-end interface (BE) 205. Similarly, the storage controller 103 includes a processor (MP) 210, a memory 212, a front-end interface (FE) 214, and a back-end interface (BE) 215. Each of the processors 200 and 210 has a plurality of processor cores (not illustrated) therein.

A host system (not illustrated) that accesses the storage apparatus 100 is connected to the storage apparatus 100 via the front-end interfaces 204 and 214. The host system and the front-end interfaces 204 and 214 are connected by a transmission line such as a Fibre Channel cable or an Ethernet cable.

Alternatively, the host system and the front-end interfaces 204 and 214 may be connected via a storage area network including a plurality of transmission lines and a plurality of switches. The front-end interfaces 204 and 214 convert a data transfer protocol between the host system and the storage node 101 and a data transfer protocol in the storage controllers 102 and 103.

The drive box 230 is connected to the storage controllers 102 and 103 via the back-end interfaces 205 and 215. The back-end interfaces 205 and 215 convert a data transfer protocol in the storage controllers 102 and 103 and a data transfer protocol between the storage controllers 102 and 103 and the drive box 230. When the drive in the drive box is a PCIe connected NVMeSSD, the back-end interfaces 205 and 215 are PCIe switches that do not perform protocol conversion.

The processors 200 and 210 control data transfer between the host system connected via the front-end interfaces 204 and 214 and the drive box 230 connected via the back-end interfaces 205 and 215. Further, the processors 200 and 210 control data transfer between the storage nodes.

The memories 202 and 212 are main memories of the processors 200 and 210, respectively, and store programs (storage control programs and the like) executed by the processors 200 and 210, management tables referred to by the processors 200 and 210, and the like. The memories 202 and 212 are also used as cache memories of the storage controllers 102 and 103, respectively.

Further, the storage controllers 102 and 103 include non-transparent bridges (NTBs) 203 and 213 connected to the processors 200 and 210 by PCIe, respectively, and edge interfaces (EIF) 104 and 105, respectively.

The NTB 203 and the NTB 213 are connected by a non-transparent link 220. The processors 200 and 210 can communicate with each other via the non-transparent link 220. In this manner, in the storage node 101, two controllers 102 and 103 constitute a dual controller.

Each of the edge interfaces 104 and 105 has one or more physical ports for connecting an Ethernet link. Hereinafter, this physical port is referred to as an Ethernet port. In the storage apparatus 100 according to the present embodiment, the edge interface 104 includes one or more Ethernet ports 207, and the edge interface 105 includes one or more Ethernet ports 217. The processors 200 and 210 are connected to the Ethernet switches 120 and 130 in FIG. 1 through Ethernet ports 207 and 217, respectively. As a result, the storage controllers belonging to different storage nodes can communicate with each other.

Figure 3:
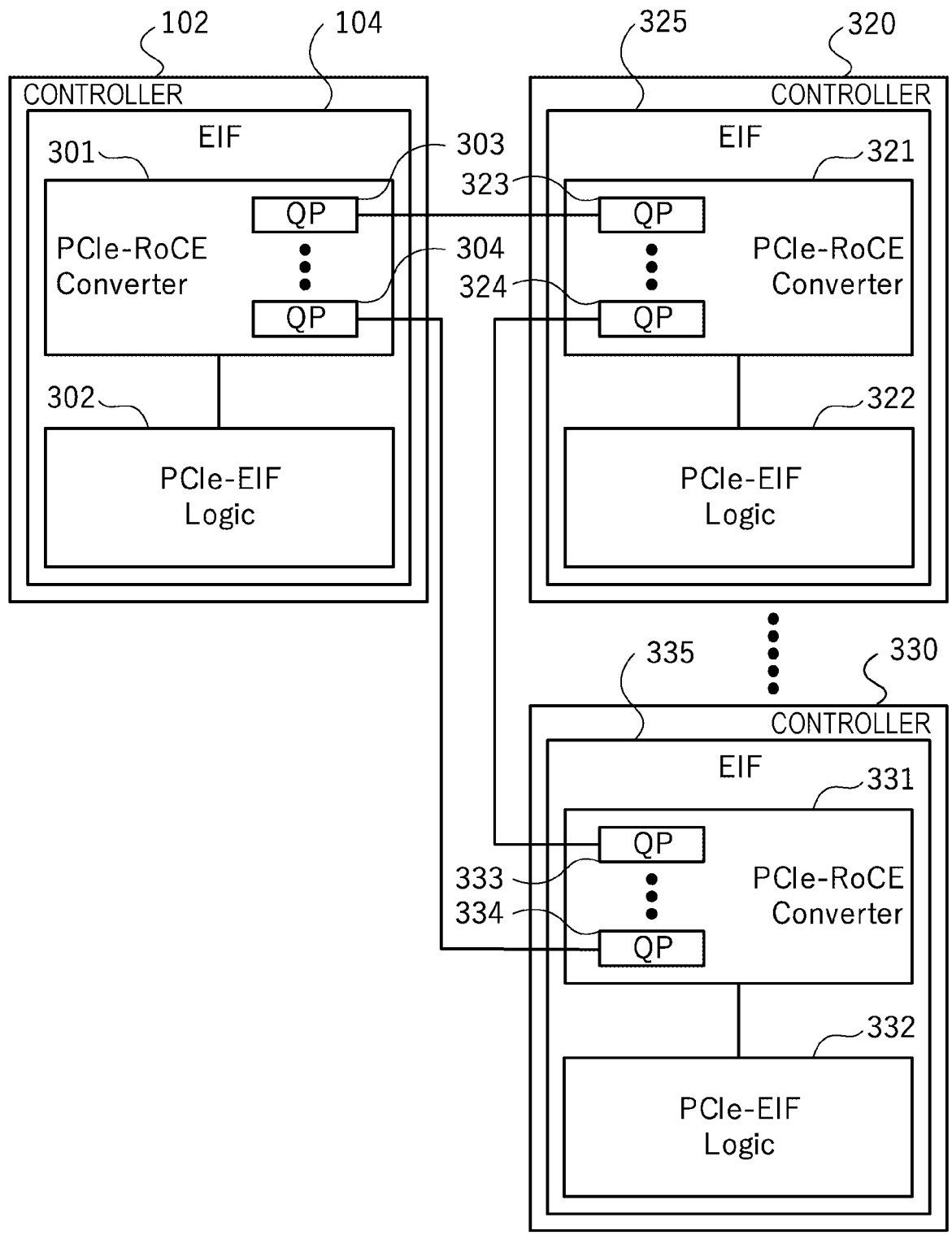
FIG. 3 is a diagram for explaining logical connections between storage controllers.

FIG. 3 is a diagram for explaining logical connection by Ethernet of the storage internal network according to the first embodiment. In the storage apparatus according to the first embodiment, RoCE is used for data transfer between the storage controllers. RoCE is a protocol that enables data transfer by RDMA over Ethernet. The edge interfaces 104 and 105 connecting the storage controllers are capable of RDMA data transfer by RoCE.

In FIG. 3, the edge interface 104 of the storage controller 102 includes a PCIe-EIF logic unit 302 and a PCIe-RoCE converter 301. A PCIe-EIF logic unit 302 implements a storage data transfer function of the edge interface. When PCIe is applied to the internal network, the storage internal network is configured by connecting the PCIe-EIF logic unit 302 to the PCIe switch.

The PCIe-RoCE converter 301 performs conversion between a PCIe packet sent and received by the PCIe-EIF logic unit 302 and an RoCE packet transferred on an internal network (Ethernet). An edge interface 325 of a storage controller 320 includes a PCIe-EIF logic unit 322 and a PCIe-RoCE converter 321. Similarly, an edge interface 335 of a storage controller 330 includes a PCIe-EIF logic unit 332 and a PCIe-RoCE converter 331.

In RoCE, data transfer is performed using a queue pair (QP) which is a logical communication port (logical port). In particular, in a reliable connection (RC) service of RoCE, a QP is prepared for each storage controller as a communication partner. The storage apparatus according to the first embodiment uses an RC service of RoCE. Therefore, the edge interface of each storage controller includes at least an individual QP for each storage controller of the connection destination.

For example, the edge interface 104 of the storage controller 102 includes a QP 303 for connection with the storage controller 320. The edge interface 104 of the storage controller 102 includes a QP 304 for connection with the storage controller 330.

Similarly, the edge interface 325 of the storage controller 320 includes a QP 323 for connection with the storage controller 102. The edge interface 325 of the storage controller 320 includes a QP 324 for connection with the storage controller 330.

Similarly, the edge interface 335 of the storage controller 330 includes a QP 334 for connection with the storage controller 102. The edge interface 335 of the storage controller 330 includes a QP 333 for connection with the storage controller 320. Bidirectional communication is possible between the two QPs.

Figure 4:
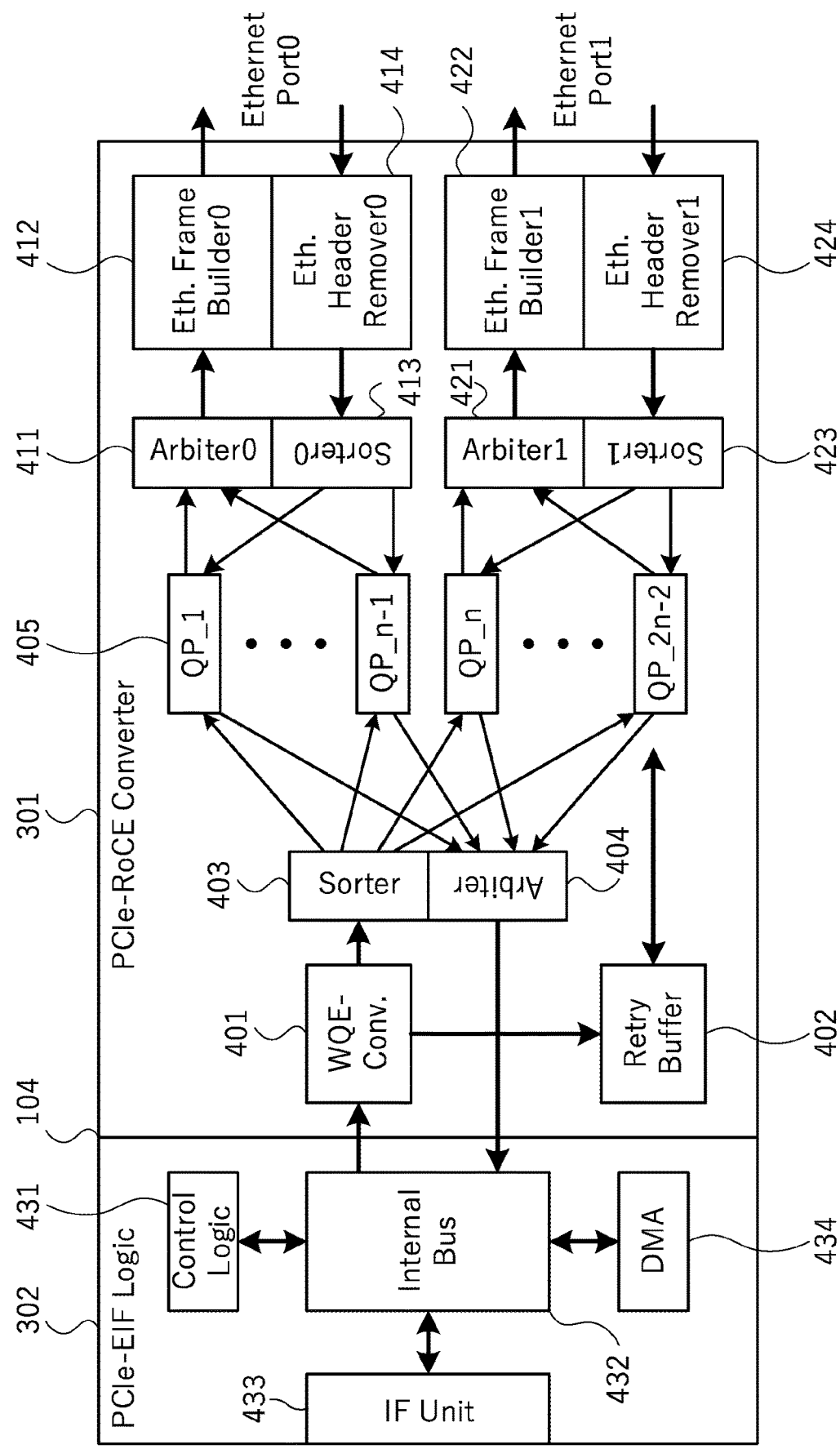
FIG. 4 is a diagram for explaining a configuration of an edge interface.

FIG. 4 is a diagram for explaining a configuration of the edge interface 104 according to the first embodiment. As described above, the edge interface 104 includes the PCIe-EIF logic unit 302 and the PCIe-RoCE converter 301.

The PCIe-EIF logic unit 302 includes an interface unit 433 for connection with the processor 200 in the storage controller, a control logic unit 431, a direct memory access (DMA) 434, and an internal bus 432 for connecting them.

The PCIe-RoCE converter 301 includes a WQE converter 401, a retry buffer 402, sorters 403, 413, and 423, arbiters 404, 411, and 421, a plurality of QPs 405, Ethernet frame builders 412 and 422, and Ethernet header removers 414 and 424. One QP among the plurality of QPs 405 is indicated by reference numeral 405 as an example.

The WQE converter 401 converts the PCIe request received from the PCIe-EIF logic unit 302 into a work queue element (WQE) of the RoCE and sends the WQE to the sorter 403. WQE includes a data transfer instruction of RDMA processed by QP. When receiving a PCIe completion from the PCIe-EIF logic unit 302, the WQE converter 401 sends the PCIe completion as it is to the sorter 403 without converting the PCIe completion. When receiving the PCIe Write request, the WQE converter 401 stores the send data included in the payload in the retry buffer 402. Details of the processing of the WQE converter 401 will be described later.

The sorter 403 sorts the WQE received from the WQE converter 401 to any one of the QPs 405 of QP_1 to QP_2n-2 according to the QP number specified in the WQE. When receiving the PCIe completion, the sorter 403 sorts the PCIe completion to any one QPs 405 of QP_1 to QP_2n-2 according to the requestor ID in the header.

The QP 405 converts WQE or PCIe completion into transport layer packets of RoCE and sends the transport layer packets to the arbiters 411 and 421. The QP 405 also performs re-send control in the RoCE transport layer. In the case of re-sending, the QP 405 reads data to be re-sent from the retry buffer 402. In a case where the number of connection destination controllers per port of the edge interface 104 is n−1 at maximum, the PCIe-RoCE converter 301 has QPs for two ports. Therefore, the PCIe-RoCE converter 301 includes 2n-2 QPs in total.

The arbiters 411 and 421 send the RoCE transport layer packets received from the QP 405 to the Ethernet frame builders 412 and 422.

The Ethernet frame builders 412 and 422 add an Ethernet header, an internet protocol (IP) header, a user datagram protocol (UDP) header, and a frame check sequence (FCS) to the RoCE transport layer packets received from the arbiters 411 and 421, assemble an Ethernet frame, and send the Ethernet frame from the Ethernet port to the internal network.

The Ethernet header removers 414 and 424 remove the Ethernet header, the IP header, the UDP header, and the FCS from the Ethernet frame received from the internal network via the Ethernet port, and send the obtained RoCE transport layer packet to the sorters 413 and 423.

The sorters 413 and 423 sort the RoCE transport layer packets received from the Ethernet header removers 414 and 424 to one of the QPs 405 of QP_1 to QP_2n-2 according to the QP number in the header.

The QP 405 converts the RoCE transport layer packets received from the sorters 413 and 423 into PCIe packets and sends the PCIe packets to the arbiter 404.

The arbiter 404 sends the PCIe packet received from the QP 405 to the PCIe-EIF logic unit 302.

Next, the operation of the WQE converter 401 will be described with reference to FIGS. 5 to 7. FIG. 5 illustrates an address-QP number conversion table 500 included in the WQE converter 401. The address-QP number conversion table 500 stores a destination address range 501 of the PCIe request, a destination QP number 502, and a source QP number 503.

Here, the destination QP number 502 is a QP number of another controller that is an RoCE packet destination, and the source QP number 503 is a QP number of its own controller that is an RoCE packet source. In the storage apparatus according to the first embodiment, the destination address range 501 of the PCIe request sent by a PCIe-EIF logic unit and the destination QP number 502 of the RoCE packet are associated on a one-to-one basis.

In the RC service of the RoCE, the destination QP number 502 and the source QP number 503 have a one-to-one correspondence. Therefore, the WQE converter 401 can specify a source QP number from the destination address range of the PCIe request by referring to this table.

When the sorter 403 is implemented by a PCIe switch, the address-QP number conversion table 500 stores a QP address 504 to be a send destination of WQE. The WQE converter 401 specifies the QP address 504 to be the send destination of WQE from the destination address of a conversion source PCIe request of WQE. Then, the WQE converter 401 sends the PCIe Write in which the WQE is stored in the payload to the specified QP address 504.

Figure 6:
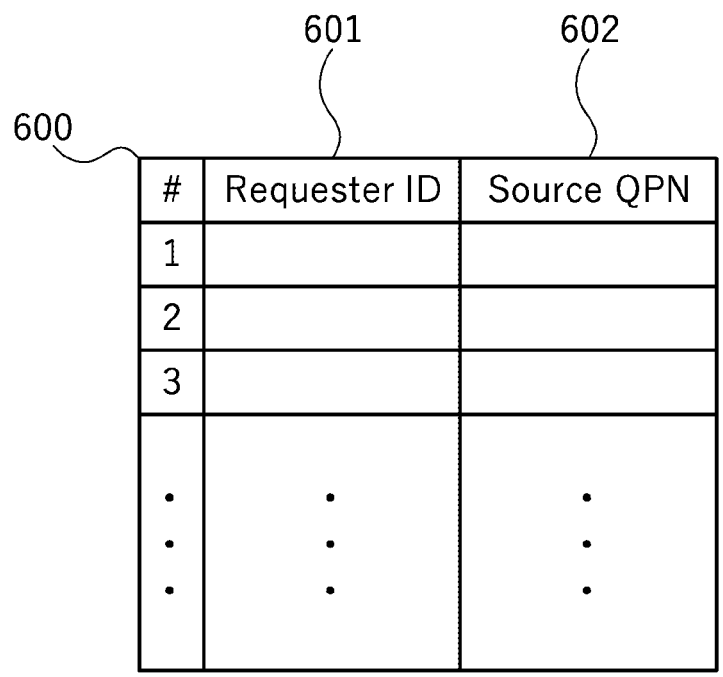
FIG. 6 is a diagram for explaining a requestor ID-QP number conversion table.

FIG. 6 illustrates a requestor ID-QP number conversion table 600 included in the WQE converter 401. The requestor ID-QP number conversion table 600 stores a destination requestor ID 601 of the PCIe completion packet and a source QP number 602. The WQE converter 401 can specify the source QP number from the destination requestor ID of the PCIe completion packet by referring to this table.

When the sorter 403 is implemented by a PCIe switch, the PCIe switch can route PCIe packets based on the requestor ID, and thus the WQE converter 401 does not need to include the requestor ID-QP number conversion table 600.

Figure 7:
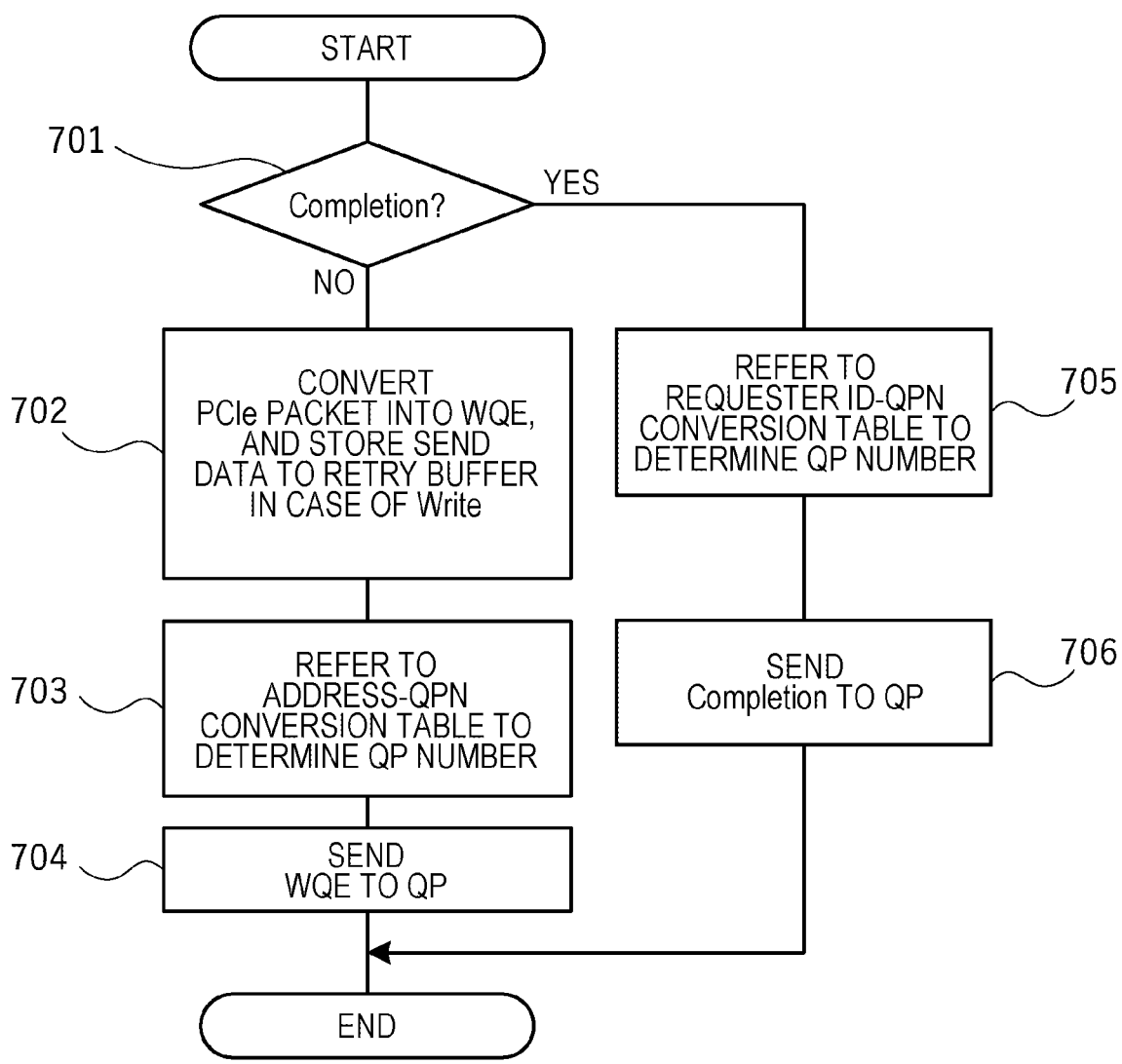
FIG. 7 is a diagram for explaining a processing flow of a WQE converter.

FIG. 7 is a diagram for explaining a flowchart of exemplary processing executed by the WQE converter 401.

In Step 701, the WQE converter 401 determines whether the packet received from the PCIe-EIF logic unit 302 is a PCIe request or a PCIe completion. When the received packet is a PCIe request (701: N), the process proceeds to Step 702, and when the received packet is PCIe completion (701: Y), the process proceeds to Step 705.

In Step 702, the WQE converter 401 converts the PCIe request to WQE. The content of this conversion processing will be described later. When the PCIe request is a PCIe Write, the WQE converter 401 stores send data included in the payload to the retry buffer 402.

In Step 703, the WQE converter 401 identifies the source QP number with reference to the address-QP number conversion table 500. When the sorter 403 is implemented by a PCIe switch, the WQE converter 401 refers to the address-QP number conversion table 500 to specify the address of the destination QP.

In Step 704, the WQE converter 401 sends the WQE via the sorter 403 to the QP 405 of the identified number.

In Step 705, the WQE converter 401 refers to the requestor ID-QP number conversion table 600 to specify the source QP number. When the sorter 403 is realized by a PCIe switch, this step can be omitted.

In Step 706, the WQE converter 401 sends the PCIe completion to the QP 405 of the identified number via the sorter 403.

Figure 8:
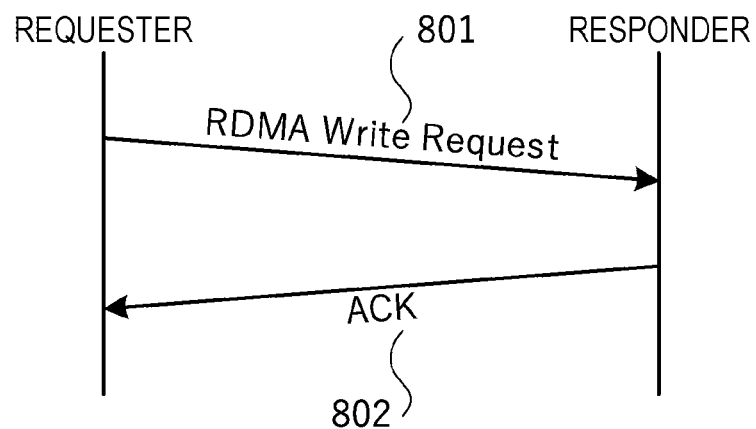
FIG. 8 is a diagram for explaining an RDMA Write sequence.

Next, an RDMA Write operation of the RoCE and a packet format thereof will be described with reference to FIGS. 8 to 10. FIG. 8 is a diagram illustrating an exemplary sequence of an RDMA Write operation. The RDMA Write is an operation of writing data in the memory space on the requestor side to the memory space on the responder side. The requestor sends an RDMA Write request 801 in which write data is stored in a payload to the responder. The responder sends an acknowledgement (ACK) 802 to the requestor in order to notify the requestor of completion of reception of the write data.

Figure 9:
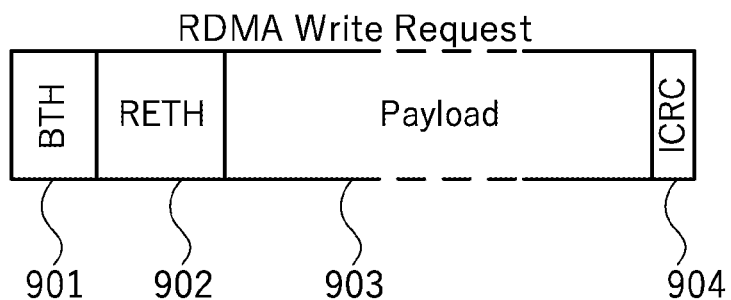
FIG. 9 is a diagram for explaining an RDMA Write request packet.

FIG. 9 is a diagram illustrating a packet format of an RDMA Write request. The RDMA Write request packet includes a base transport header (BTH) 901, an RDMA extended transport header (RETH) 902, a payload 903, and an invariant cyclic redundancy check (ICRC) 904.

Figure 10:
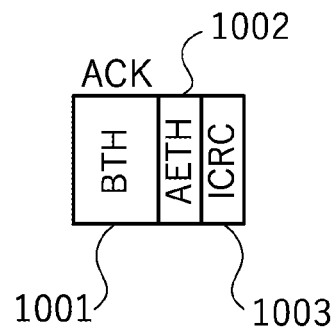
FIG. 10 is a diagram for explaining an ACK packet.

FIG. 10 is a diagram illustrating a packet format of ACK. The ACK packet includes a BTH 1001, an ACK extended transport header (AETH) 1002, and an ICRC 1003.

Figure 11:
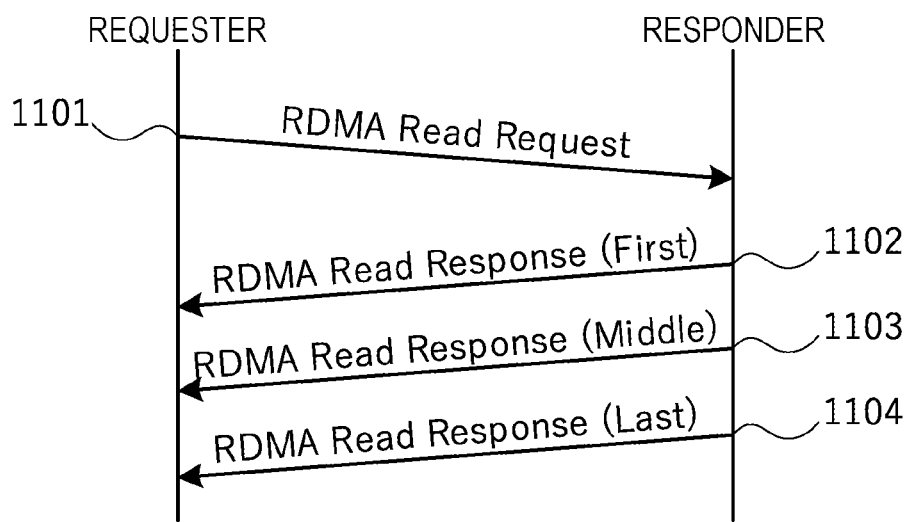
FIG. 11 is a diagram for explaining an RDMA Read sequence.

Next, an RDMA Read operation of the RoCE and a packet format thereof will be described with reference to FIGS. 11 to 14. FIG. 11 is a diagram illustrating an exemplary sequence of the RDMA Read operation. The RDMA Read is an operation of reading data in the memory space of the responder into the memory space of the requestor.

The requestor sends an RDMA Read request 1101 storing read destination information to the responder. The responder sends an RDMA Read response in which the read data is stored in the payload to the requestor. When the read data size exceeds a maximum payload size, the responder divides the read data and sends a plurality of RDMA Read responses 1102, 1103, and 1104 including First, Middle, and Last.

Figure 12:
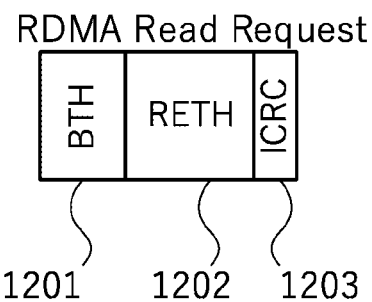
FIG. 12 is a diagram for explaining an RDMA Read request packet.

FIG. 12 is a diagram illustrating a packet format of the RDMA Read request. The RDMA Read request packet includes a BTH 1201, a RETH 1202, and an ICRC 1203.

Figure 13:
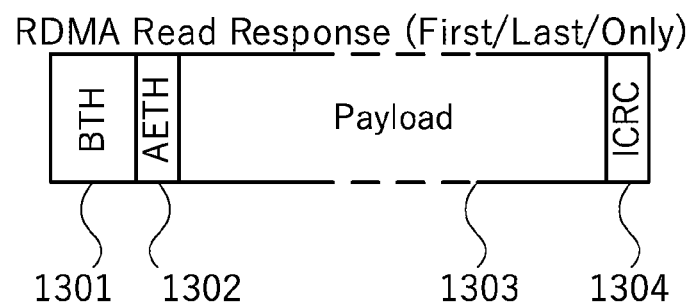
FIG. 13 is a diagram for explaining an RDMA Read response packet.

FIG. 13 is a diagram illustrating a packet format of an RDMA Read response (First/Last/Only). The RDMA Read response (First/Last/Only) packet includes a BTH 1301, an AETH 1302, a payload 1303, and an ICRC 1304. The RDMA Read response (Only) packet is used when the response is a single packet.

Figure 14:
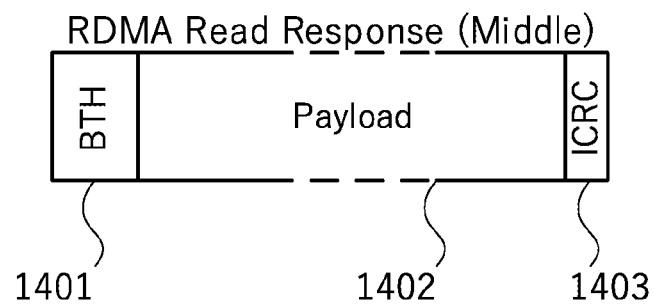
FIG. 14 is a diagram for explaining an RDMA Read response packet.

FIG. 14 is a diagram illustrating a packet format of the RDMA Read response (Middle). The RDMA Read response (Middle) packet includes a BTH 1401, a payload 1402, and an ICRC 1403.

FIG. 15 is a diagram for explaining a format of a BTH used in the storage apparatus according to the first embodiment. In a BTH format 1500, as a result of omitting fields not used in the storage apparatus according to the first embodiment from the BTH (12 B length) of the RoCE standard, the data size of the BTH is 8 B.

An operation code (OpCode) 1501 is a field for storing an operation code of the RoCE.

A destination QP 1502 indicates a QP number of a packet destination. The QP number of the RoCE standard is 3 B in length, but the total number of QPs may be small in the storage apparatus according to the first embodiment, so that the QP number is shortened to 2 B in length.

A first Byte Enable (1stBE) 1504 and a last Byte Enable (LastBE) 1503 store the values of the 1st Byte Enable and last Byte Enable fields of the conversion source PCIe packet header as they are. As will be described later, in the internal network of the storage apparatus according to the first embodiment, addresses are designated in units of 4 B similarly to PCIe, and therefore these fields that are not included in the RoCE standard are required. The meaning of the field is similar to Byte Enable of PCIe.

An ACKREQ (A) 1505 indicates an ACK request bit. When the requestor sends an RDMA Write request set to A=1, the responder that receives the RDMA Write request schedules sending of an ACK. The ACKREQ is valid only in the case of the RDMA Write request.

An Error Poisoned (E) 1506 is a field not included in the RoCE standard, and stores the value of the Error Poisoned field of the conversion source PCIe packet header as it is.

A completion status (CS) 1507 is a field not included in the RoCE standard, and stores the value of the Completion Status field of the conversion source PCIe completion header as it is. This field is valid only when the RoCE packet is an RDMA Read response.

A packet sequence number (PSN) 1508 is a packet sequence number assigned to each sending packet of the RoCE.

The other fields of the BTH are not used in the storage apparatus according to the first embodiment, or are the same as the RoCE standard, and thus the description thereof will be omitted. As described above, by storing PCIe information in a field not included in the RoCE standard, conversion between PCIe and RoCE becomes easy.

FIG. 16 is a diagram for explaining a format of a RETH used in the storage apparatus according to the first embodiment. In an RETH format 1600, as a result of omitting a field not used in the storage apparatus according to the first embodiment from the RETH (16 B length) of the RoCE standard, the data size of the RETH is 12 B.

In the RoCE standard, remote addresses 1601 and 1602 are designated in units of 1 B using values of 64 bits of 0 bits to 63 bits, but in the storage apparatus according to the first embodiment, similarly to PCIe, the remote addresses are designated in units of 4 B using values of 62 bits of 2 bits to 63 bits. Therefore, the lower 2 bits that are not used are reserved fields (R). In a case where address designation of 4 B or less is necessary, it is designated in the Byte Enable field of the BTH.

A data transfer length is designated in a DMA length 1603 field. The DMA length 1603 designates the data transfer length in units of 1 B in the RoCE standard, but designates the data transfer length in units of 4 B (Double Word) in the storage apparatus according to the first embodiment similarly to PCIe.

Since the AETH used in the storage apparatus according to the first embodiment has the same content as the format of the RoCE standard, the description thereof will be omitted.

Figure 17:
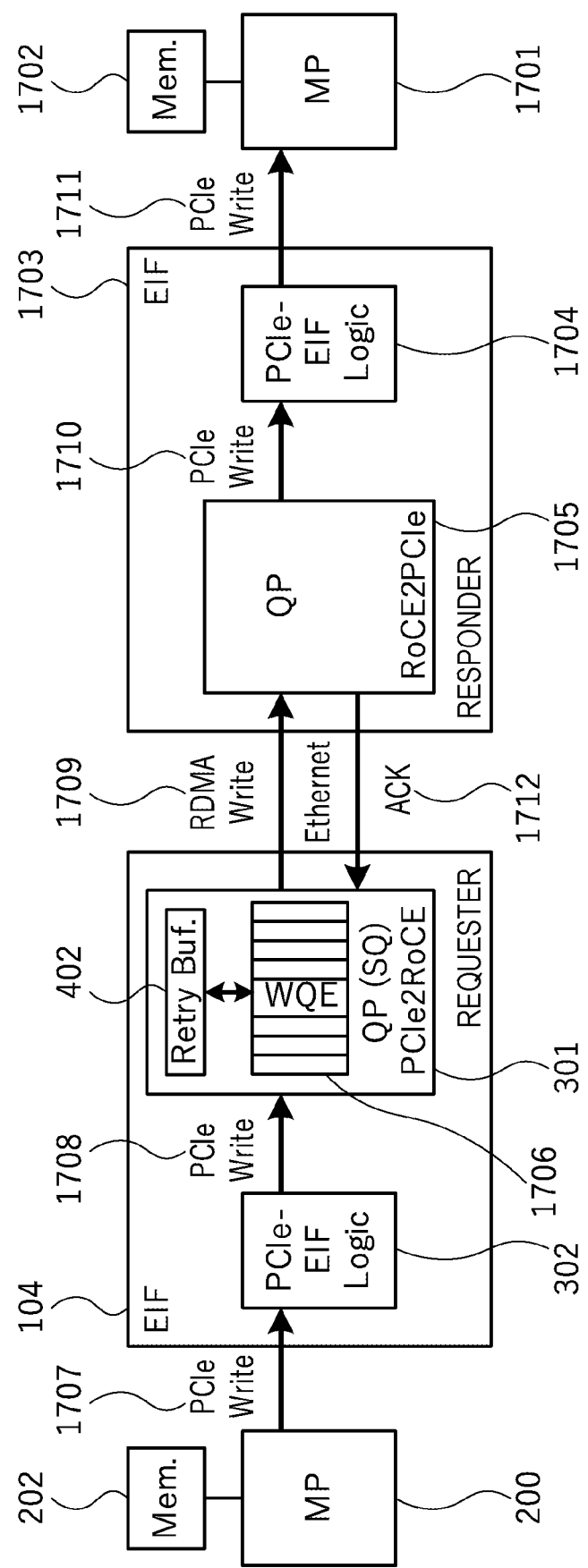
FIG. 17 is a diagram for explaining an operation of converting a PCIe Write request into an RDMA Write request.

FIG. 17 is a diagram for explaining an operation in which the PCIe-RoCE converter converts a PCIe Write request into an RDMA Write request in the storage apparatus according to the first embodiment. As an example, a case where the processor 200 sends data in the memory 202 to a memory 1702 connected to a processor 1701 will be described. The processor 200 and the processor 1701 are connected via an EIF 104 and an EIF 1703. The Ethernet switch and the Ethernet link connecting the EIF 104 and the EIF 1703 are omitted.

First, the processor 200 sends a PCIe Write request 1707 to the PCIe-EIF logic unit 302 to give an instruction of data writing from the memory 202 to the memory 1702.

The PCIe-EIF logic unit 302 sends a PCIe Write request 1708 in which send data in the memory 202 is stored in the payload to the PCIe-RoCE converter 301. The PCIe-RoCE converter 301 converts the received PCIe Write request into WQE and posts the WQE in a send queue 1706. Then, after processing the WQE, the PCIe-RoCE converter 301 sends an RDMA Write request 1709 including send data to the internal network (Ethernet). The data transfer operation through the retry buffer 402 in the PCIe-RoCE converter 301 in this case will be described later with reference to FIGS. 19 and 20. Here, the PCIe-RoCE converter 301 operates as an RoCE requestor.

The EIF 1703 includes a PCIe-EIF logic unit 1704 and a PCIe-RoCE converter 1705. The PCIe-RoCE converter 1705 converts the RDMA Write request 1709 received via the internal network (Ethernet) into a PCIe Write request 1710 and sends the PCIe Write request 1710 to the PCIe-EIF logic unit 1704. Here, the PCIe-RoCE converter 1705 operates as a responder of the RoCE. The PCIe-RoCE converter 1705 that has sent the PCIe Write request 1710 sends an ACK 1712 to the PCIe-RoCE converter 301 that is a requestor.

The PCIe-EIF logic unit 1704 sends the received PCIe Write request 1710 to the processor 1701 as a PCIe Write request 1711. Upon receiving the PCIe Write request 1711, the processor 1701 writes the data stored in the payload to the memory 1702.

Figure 18:
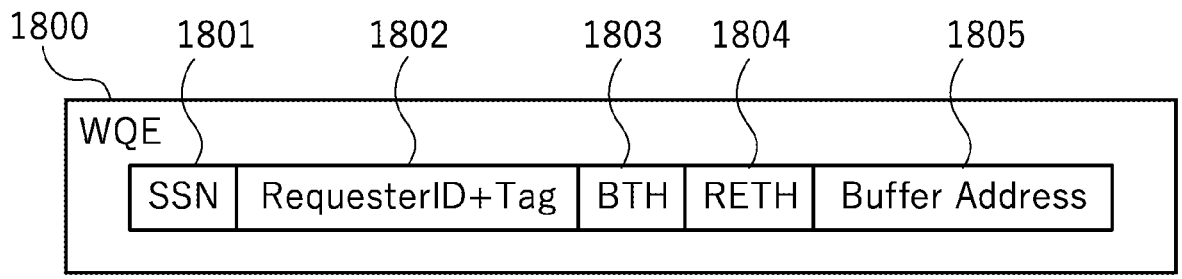
FIG. 18 is a diagram for explaining the content of a WQE for an RDMA Write request.

FIG. 18 is a diagram for explaining the content of WQE for an RDMA Write request converted from the PCIe Write request by the WQE converter of the PCIe-RoCE converter 301 in the storage apparatus according to the first embodiment. A WQE 1800 includes a send sequence number (SSN) 1801, a requestor ID and a tag 1802 of a conversion source PCIe Write request, a BTH 1803 and a RETH 1804 of a conversion destination RDMA Write request, and a retry buffer address 1805 of a send data storage destination. As a result, the conversion source PCIe Write request and the conversion destination RDMA Write request can be associated one-to-one.

Figure 19:
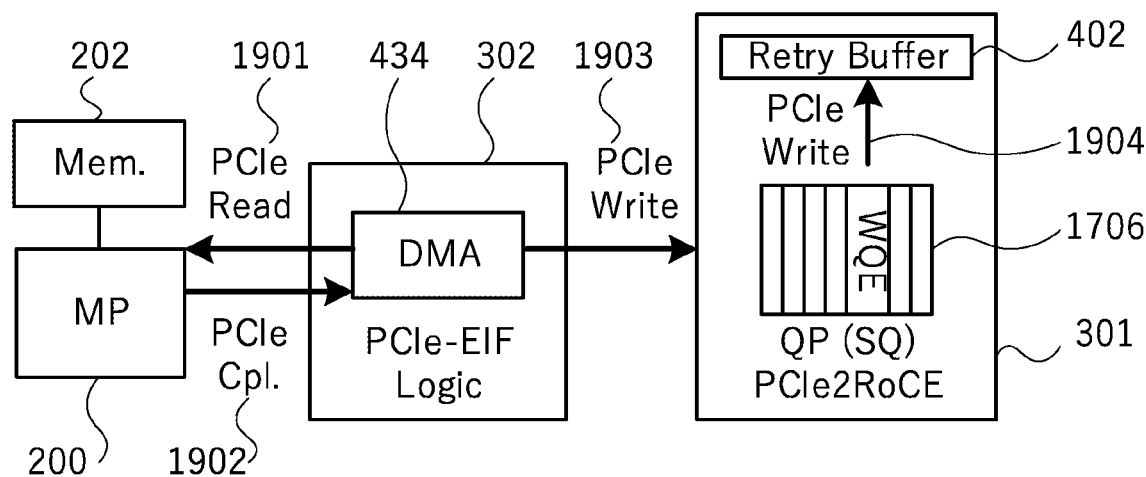
FIG. 19 is a diagram for explaining a write operation to a retry buffer.
Figure 20:
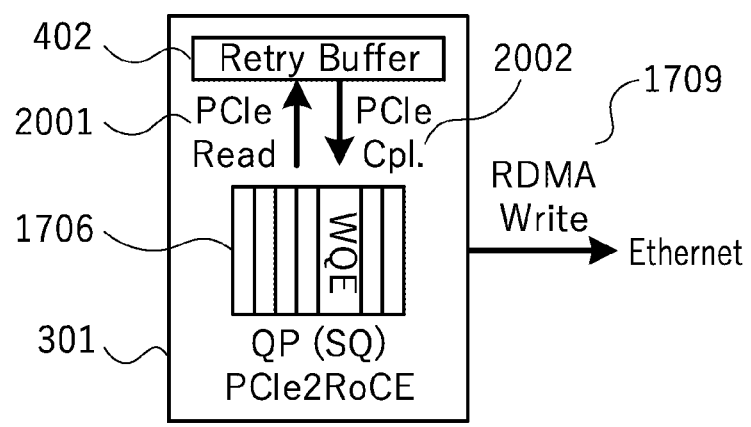
FIG. 20 is a diagram for explaining a read operation from the retry buffer.

FIGS. 19 and 20 are diagrams for explaining a data transfer operation related to the retry buffer 402. In FIG. 19, a DMA 434 of the PCIe-EIF logic unit 302 sends a PCIe Read request 1901 to the processor 200 and receives a PCIe completion 1902 for the PCIe Read request to read send data from the memory 202. The PCIe-EIF logic unit 302 sends the send data to the PCIe-RoCE converter 301 in a PCIe Write request 1903. The PCIe-RoCE converter 301 performs conversion processing described later on the header of the PCIe Write request 1903, and then stores the header as WQE in the QP send queue 1706. The PCIe-RoCE converter 301 stores the content of the payload of the PCIe Write request 1903 in the retry buffer 402 in a PCIe Write request 1904.

In FIG. 20, when processing WQE in the QP send queue 1706, the PCIe-RoCE converter 301 refers to a buffer address 1805 stored in WQE. Then, the PCIe-RoCE converter 301 sends a PCIe Read request 2001 to the retry buffer 402 and receives a PCIe completion 2002 for the PCIe Read request to read the send data. Then, the PCIe-RoCE converter 301 sends an RDMA Write request 1709 in which the send data is stored in a payload to the internal network (Ethernet). Also at the time of re-sending of the RDMA Write request, the PCIe-RoCE converter 301 reads the send data from the retry buffer 402 and re-sends the request.

Figure 21:
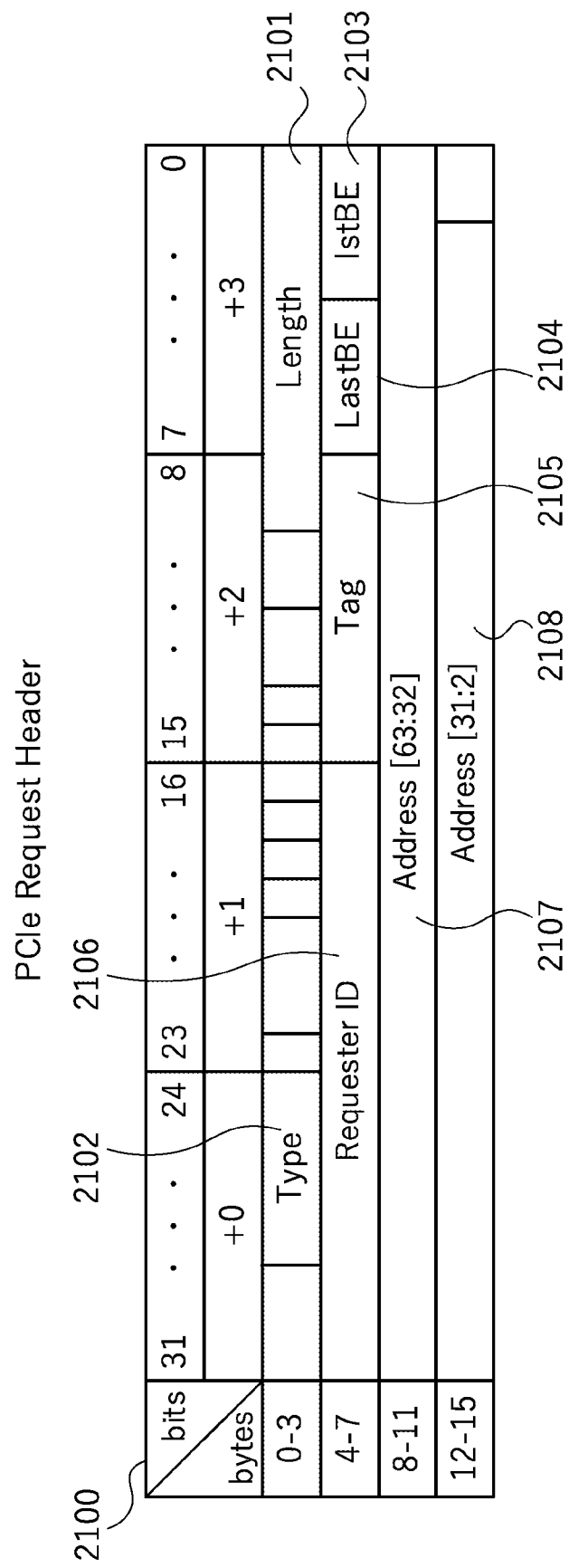
FIG. 21 is a diagram for explaining a format of a PCIe request header.

Next, conversion processing from the PCIe Write request to the WQE will be described with reference to FIGS. 21 and 22. FIG. 21 is a diagram for explaining a header format of the PCIe request. A header format 2100 of the PCIe request is not changed from the format of the PCIe standard, but a field related to the conversion processing from the PCIe Write request to the WQE will be described here.

A Length 2101 stores a data size in units of DW (Double Word, 4 B) stored in the payload of the PCIe Write request.

A Type 2102 stores a PCIe request types such as Memory Write and Memory Read.

A 1stBE 2103 stores a Byte Enable value of the first data in units of 4 B.

A LastBE 2104 stores a Byte Enable value of the last data in units of 4 B.

A requestor ID 2106 stores identification information of the source PCIe device of the PCIe request. The requestor ID 2106 and the Tag 2105 together become identification information of the PCIe request.

Addresses 2107 and 2108 store destination addresses of PCIe requests.

Since the other fields are not used for conversion into the RDMA Write request, the description thereof will be omitted.

FIG. 22 is a diagram for explaining conversion processing between a header 2201 of the PCIe Write request and a header 2202 of the RDMA Write request when the PCIe-RoCE converter on the requestor side receives the PCIe Write request. Hereinafter, the conversion from the PCIe request header to the RDMA request header in the PCIe-RoCE converter on the requestor side will be described. However, the conversion from the RDMA request header to the PCIe request header in the PCIe-RoCE converter on the responder side is similar only in a different direction.

When the type field of the PCIe request header is Memory Write, the OpCode field of the BTH of the RoCE is set to RDMA Write Only (2203). In the storage apparatus according to the first embodiment, the PCIe Write request is converted to the RDMA Write request on a one-to-one basis. Here, it is assumed that the maximum payload sizes of PCIe and RoCE are the same.

The values of the 1st Byte Enable and last Byte Enable fields of the PCIe request header are stored as they are in the 1st Byte Enable and last Byte Enable fields provided in the BTH of the RoCE (2204, 2205).

The Error Poisoned field of the PCIe request header is stored as it is in the Error Poisoned field provided in the BTH of the RoCE (2206).

In the PCIe-RoCE converter on the requestor side, the requestor ID and Tag of the conversion source PCIe request header are stored in WQE in the QP send queue (2207). In WQE, a retry buffer address which is a storage destination of send data included in the payload is also stored. The PCIe-RoCE converter on the responder side does not store the requestor ID and Tag of the PCIe request header.

The value of the PCIe Address field (63:2) of the PCIe request header is stored as it is in the Remote Address field (63:2) of the RETH of the RoCE (2208, 2209).

The value of the Length field (10 bits length) of the PCIe request header is stored as it is in the DMA Length field of the RETH of the RoCE (2210). A DMA Length field (31:10) of RETH is set to 0.

Figure 23:
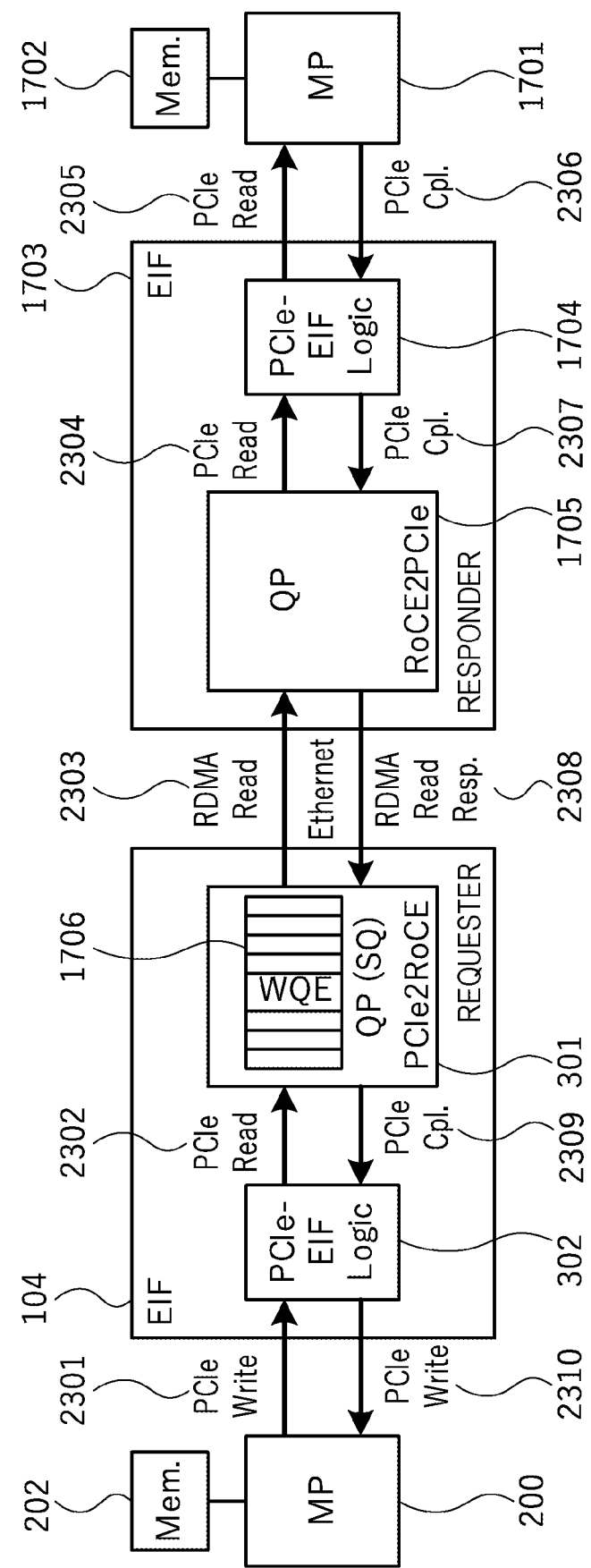
FIG. 23 is a diagram for explaining an operation of converting a PCIe Read request into an RDMA Read request.

FIG. 23 is a diagram for explaining an operation in which the PCIe-RoCE converter converts a PCIe Read request into an RDMA Read request in the storage apparatus according to the first embodiment. As an example, a case where the processor 200 receives data in the memory 1702 connected to the processor 1701 to the memory 202 will be described. The processor 200 and the processor 1701 are connected via an EIF 104 and an EIF 1703. The Ethernet switch and the Ethernet link connecting the EIF 104 and the EIF 1703 are omitted.

First, the processor 200 instructs the PCIe-EIF logic unit 302 to read data from the memory 1702 to the memory 202 by sending a PCIe Write request 2301 in which a data read instruction from the memory 1702 is stored in a payload.

The PCIe-EIF logic unit 302 sends a PCIe Read request 2302 for giving an instruction to read data in the memory 1702 to the PCIe-RoCE converter 301. Then, the PCIe-RoCE converter 301 sends an RDMA Read request 2303 converted from the received PCIe Read request 2302 to the internal network (Ethernet). Here, the PCIe-RoCE converter 301 operates as an RoCE requestor.

The PCIe-RoCE converter 1705 of the EIF 1703 converts the RDMA Read request 2303 received via the internal network (Ethernet) into a PCIe Read request 2304 and sends the PCIe Read request to the PCIe-EIF logic unit 1704. Here, the PCIe-RoCE converter 1705 operates as a responder of the RoCE.

The PCIe-EIF logic unit 1704 sends the received PCIe Read request 2304 to the processor 1701 as a PCIe Read request 2305. Upon receiving the PCIe Read request 2305, the processor 1701 reads data of a designated address from the memory 1702.

Next, the processor 1701 sends a PCIe completion 2306 storing the read data to the PCIe-EIF logic unit 1704 of the EIF 1703. The PCIe-EIF logic unit 1704 sends the received PCIe completion 2306 as a PCIe completion 2307 to the PCIe-RoCE converter 1705.

The PCIe-RoCE converter 1705 converts the PCIe completion 2307 received from the PCIe-EIF logic unit 1704 into an RDMA Read response 2308 and sends the RDMA Read response to the internal network (Ethernet).

The PCIe-RoCE converter 301 of the EIF 104 converts the RDMA Read response 2308 received via the internal network (Ethernet) into a PCIe completion 2309 and sends the PCIe completion to the PCIe-EIF logic unit 302.

The PCIe-EIF logic unit 302 converts the received PCIe completion 2309 into a PCIe Write request 2310 and sends the PCIe Write request to the processor 200.

The processor 200 writes data included in the payload of the PCIe Write request received from the PCIe-EIF logic unit 302 to the memory 202.

Figures 24, 25:
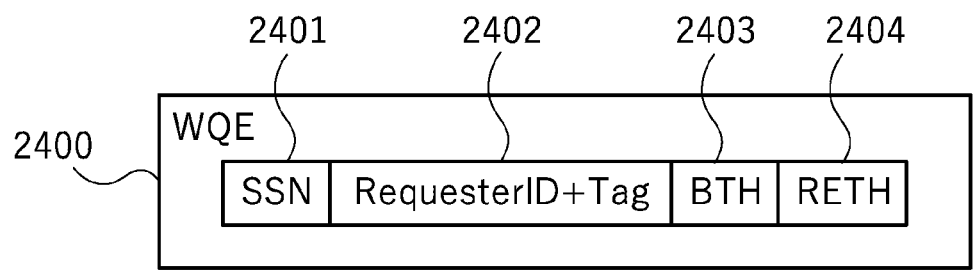
FIG. 24 is a diagram for explaining a content of a WQE for an RDMA Read request.
FIG. 25 is a diagram for explaining a PSN-PCIe Tag conversion table.

FIG. 24 is a diagram for explaining the contents of WQE for the RDMA Read request converted from the PCIe Read request by the WQE converter of the PCIe-RoCE converter 301 in the storage apparatus according to the first embodiment. A WQE 2400 includes an SSN (Send Sequence Number) 2401, a requestor ID and a Tag 2402 of the conversion source PCIe Read request, and a BTH 2403 and a RETH 2404 of the conversion destination RDMA Read request. As a result, the conversion source PCIe Read request and the conversion destination RDMA Read request can be associated one-to-one.

FIG. 25 is a diagram for explaining a PSN-PCIe Tag conversion table included in the PCIe-RoCE converter on the responder side. A PSN-PCIe Tag conversion table 2500 stores a QP number 2501 and a PSN 2502 included in the BTH of the RDMA Read request received by the PCIe-RoCE converter on the responder side. Further, the PSN-PCIe Tag conversion table 2500 stores a requestor ID and a Tag 2503 included in the header of the PCIe Read request converted from the received RDMA Read request. The PCIe-RoCE converter can convert the PCIe completion received from the PCIe-EIF logic unit into the RDMA Read response corresponding to the RDMA Read request of the conversion source by referring to the PSN-PCIe Tag conversion table 2500.

FIG. 26 is a diagram for explaining conversion processing between a header 2601 of the PCIe Read request and a header 2602 of the RDMA Read request when the PCIe-RoCE converter on the requestor side receives the PCIe Read request. Hereinafter, the conversion from the PCIe request header to the RDMA request header in the PCIe-RoCE converter on the requestor side will be described. However, the conversion from the RDMA request header to the PCIe request header in the PCIe-RoCE converter on the responder side is similar only in a different direction.

When the Type field of the PCIe request header is Memory Read, the OpCode field of the BTH of the RoCE is set to RDMA Read (2603).

The values of the 1st Byte Enable and last Byte Enable fields of the PCIe request header are stored as they are in the 1st Byte Enable and last Byte Enable fields provided in the BTH of the RoCE (2604, 2605).

The Error Poisoned field of the PCIe request header is stored as it is in the Error Poisoned field provided in the BTH of the RoCE (2606).

In the PCIe-RoCE converter on the requestor side, the requestor ID and Tag of the conversion source PCIe request header are stored in WQE in the QP send queue. The PCIe-RoCE converter on the responder side stores the requestor ID and the Tag included in the PCIe request header and the QP number and the PSN included in the RDMA Read request header in the PSN-PCIe Tag conversion table 2500 of FIG. 25 (2607).

The value of the PCIe Address field (63:2) of the PCIe request header is stored as it is in the Remote Address field (63:2) of the RETH of the RoCE (2608, 2609).

The value of the Length field (10 bits length) of the PCIe request header is stored as it is in the DMA Length field of the RETH of the RoCE (2610). A DMA Length field (31:10) of the RETH is set to 0.

Figure 27:
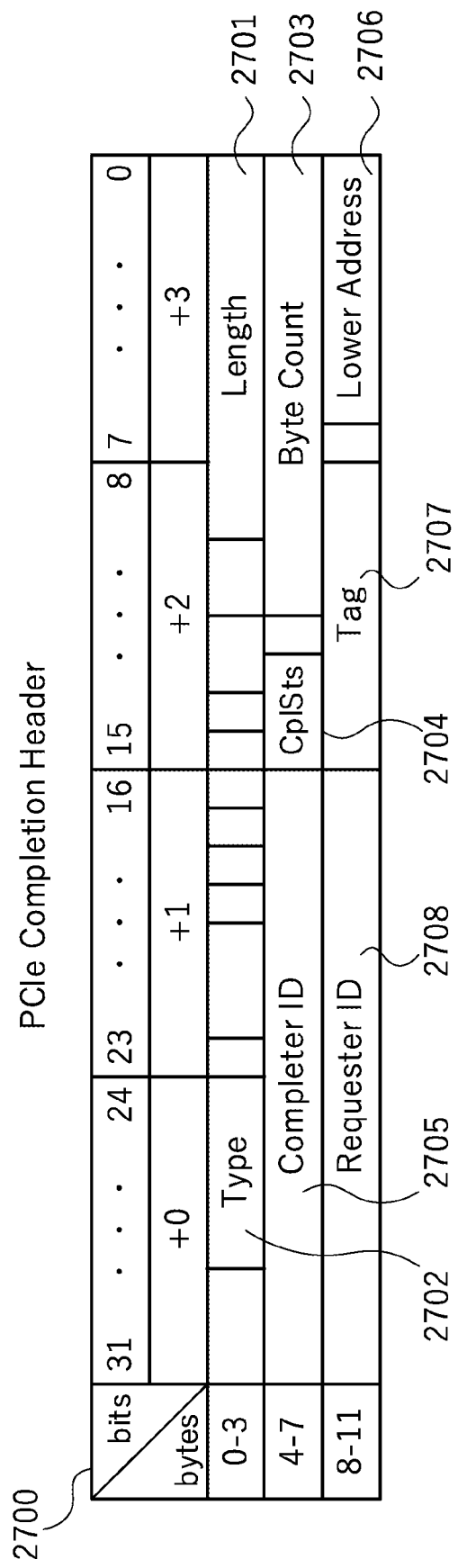
FIG. 27 is a diagram for explaining a format of a PCIe completion header.

FIG. 27 is a diagram for explaining a header format of the PCIe completion. The header format 2700 of the PCIe completion is not changed from the format of the PCIe standard, but the fields related to the conversion processing from the PCIe completion to the RDMA Read response will be described here.

A Length 2701 stores a data size in units of double word (DW) stored in the payload of the PCIe completion.

A Type 2702 stores a type indicating PCIe completion.

A Byte Count 2703 stores the remaining number of bytes including the current packet with respect to the read data size designated by the PCIe Read request.

A completion status (CplCts) 2704 stores a status of a result of executing PCIe Read on the responder side.

A Lower Address 2706 stores a head address of data included in the PCIe completion.

A completer ID 2705 stores identification information of a PCIe completion source PCIe device.

A requestor ID 2708 stores identification information of the source PCIe device of the PCIe Read request corresponding to the PCIe completion. The requestor ID 2708 and the Tag 2707 together become identification information of a PCIe Read request corresponding to PCIe completion.

FIG. 28 is a diagram for explaining conversion contents of a header 2801 of the PCIe completion 2307 and a header 2802 of the conversion destination RDMA Read response 2308 received by the PCIe-RoCE converter 1705 on the responder side.

When the Type field of the PCIe completion header is Completion, the OpCode field of the BTH of the RDMA Read response is set to RDMA Read Response (2803). However, as illustrated in FIG. 11, it is necessary to change the OpCode of the RDMA Read response to the RDMA Read response First (1102), Middle (1103), Last (1104), or RDMA Read response Only according to the read data size or the position with respect to the entire read data included in the response.

The Length field of the PCIe completion header is not converted since there is no corresponding RDMA Read Response header field (2804).

The value of the CplSts field of the PCIe completion header is stored as it is in the CS field provided in the BTH of the RDMA Read response (2805).

The Byte Count field of the PCIe completion header is not converted since there is no corresponding RDMA Read Response header field (2806).

The requestor ID and the Tag of the PCIe completion header are converted into the QP number and PSN in the BTH of the RDMA Read response with reference to the PSN-PCIe Tag conversion table 2500 of FIG. 25 (2807).

The Lower Address field of the PCIe completion header is not converted since there is no corresponding RDMA Read response header field (2808).

Even when the read data size is equal to or smaller than the maximum payload size, the processor may divide the read data into a plurality of packets and send the PCIe completion. In this case, the PCIe-RoCE converter collects the plurality of pieces of read data that are divided and sent, in units of the maximum payload size of the RDMA Read response, and converts the PCIe completion into the RDMA Read response.

FIG. 29 is a diagram for explaining conversion contents of the header 2901 of the RDMA Read response 2308 received by the PCIe-RoCE converter 301 on the requestor side and the header 2902 of the conversion destination PCIe completion 2309.

When the OpCode field of the RDMA Read response header is the RDMA Read response (First, Middle, Last, Only), the type field of the PCIe completion header is set to Completion (2903).

The set value of the Length field (2904) of the PCIe completion header changes as follows according to the type of the RDMA Read response. Here, it is assumed that the maximum payload sizes of PCIe and RoCE are the same.

When the OpCode field is the RDMA Read response Only, the Length field of the PCIe completion header refers to the RETH stored in the WQE corresponding to the PSN of the RDMA Read response header, and sets the value of the DMA Length field. When the OpCode field is RDMA Read response First or Middle, a value of ¼ of the maximum payload size (byte unit) is set in the Length field. When the OpCode field is the RDMA Read response Last, the Length field of the PCIe completion header refers to the RETH stored in the WQE corresponding to the PSN of the RDMA Read response header, and sets a remainder value obtained by dividing the value of the DMA Length field by ¼ of the maximum payload size.

The value of the CS field provided in the BTH of the RDMA Read response is set as it is in the CplSts field of the PCIe completion header (2905).

A Byte Count field (2906) of the PCIe completion header refers to the RETH stored in the WQE corresponding to the PSN of the RDMA Read response header, and sets a value obtained by subtracting the received data size (number of received response times×maximum payload size; however, not including current packet) from four times the value of the DMA Length field. That is, the Byte Count field sets the remaining number of bytes including the current packet with respect to the read data size designated by the Read request.

The requestor ID and the Tag field of the PCIe completion header store values stored with reference to WQE corresponding to the PSN of the RDMA Read response header (2907).

The Lower Address field (2908) of the PCIe completion header refers to the WQE corresponding to the PSN of the RDMA Read response header, and sets a value converted from the stored 1st Byte Enable field of the BTH, the stored Remote Address field of the RETH, and the received data size (not including the current packet). When the maximum payload sizes of the PCIe and the RoCE are multiples of 128 B, the Lower Address field (2908) sets the lower 7 bits of the sum of the value of the Remote Address field and Offset shown below. Here, Offset when the 1st Byte Enable is '1111$b$' is 0, Offset when the 1st Byte Enable is '1110$b$' is 1, Offset when the 1st Byte Enable is '1100$b$' is 2, and Offset when the 1st Byte Enable is '1000$b$' is 3.

The conversion operation between the PCIe Read request and the RDMA Read request in the storage apparatus according to the first embodiment described above is summarized. First, the PCIe-RoCE converter 301 on the requestor side that has received the PCIe request 2302 from the PCIe-EIF logic unit 302 stores the requestor ID and the Tag of the received PCIe request 2302 in the WQE of the send queue 1706. Further, the PCIe-RoCE converter 301 also stores the PSN of the RDMA Read request 2303 converted from the received PCIe request 2302 in the WQE. Then, the PCIe-RoCE converter 301 receives the RDMA Read response 2308 from the PCIe-RoCE converter 1705 on the responder side. Then, the PCIe-RoCE converter 301 can convert the RDMA Read response 2308 into the PCIe completion 2309 by referring to the PSN of the RDMA Read response 2308, the PSN, the requestor ID, and the Tag stored in the WQE.

As described above, the storage apparatus according to the first embodiment can convert the PCIe request sent by the PCIe-EIF logic unit that realizes the function for storage into the RDMA request of the RoCE on a one-to-one basis. As a result, the storage apparatus according to the first embodiment can realize the storage data transfer function included in the PCIe-EIF logic unit even when Ethernet is applied to the internal network.

For example, as described with reference to FIG. 17 or 23, in a case where the PCIe request used in the storage controller is converted into the RDMA request used in the inter-storage controller network, the edge interface which is the controller interface includes the identification information of the PCIe request and the identification information of the RDMA request in the WQE and stores the information in the send queue of the QP.

The identification information of the PCIe request can include, for example, the requestor ID and the Tag as described with reference to FIG. 18 or 24. The requestor ID and the Tag are identification information of a source device and a packet identification number of a request, respectively. Further, the identification information of the RDMA request may include a PSN. The PSN is a packet identification number of the RDMA request and is included in the BTH.

For example, as described with reference to FIG. 5, the edge interface may store the destination address of the PCIe request and the identification information of the QP, for example, the information of the correspondence relationship between DestQPN and SrcQPN. Further, information on a correspondence relationship between the identification information of the QP and the address information of the QP in the PCIe, for example, a QP address may be stored.

For example, as described with reference to FIG. 15, 27, or 28, in a case where the PCIe completion of the PCIe is converted into the RDMA Read response, the edge interface of the storage controller that has received the RDMA Read request stores the status of the read execution result in the header of the RDMA Read response and sends the RDMA Read response. The Completion Status is a status of the read execution result.

For example, as described with reference to FIG. 25, in a case where the edge interface that has received the RDMA Read request converts the request into a PCIe request, the edge interface that has received the RDMA Read request may store information on a correspondence relationship among the identification information of the QP that has received the RDMA Read request, the identification information of the RDMA Read request, and the identification information of the converted PCIe request.

Although the first embodiment describes conversion between the PCIe and the RoCE, the features of the present disclosure can be applied to conversion between protocols different from these. This point is similar to the other embodiments described below.

Second Embodiment

A storage apparatus according to a second embodiment will be described with reference to FIGS. 30 to 34. Since other configurations of the storage apparatus of the second embodiment are similar to those of the storage apparatus of the first embodiment, the description thereof will be omitted.

The data sent and received between the storage controllers includes user data and control data. In order to improve storage performance, throughput performance is required for user data transfer, and a decrease in transfer time is required for control data transfer. In the storage apparatus according to the second embodiment, a conversion method between the PCIe Write request and the RDMA Write request of the RoCE suitable for the control data transfer time in a particularly short time will be described.

Figure 30:
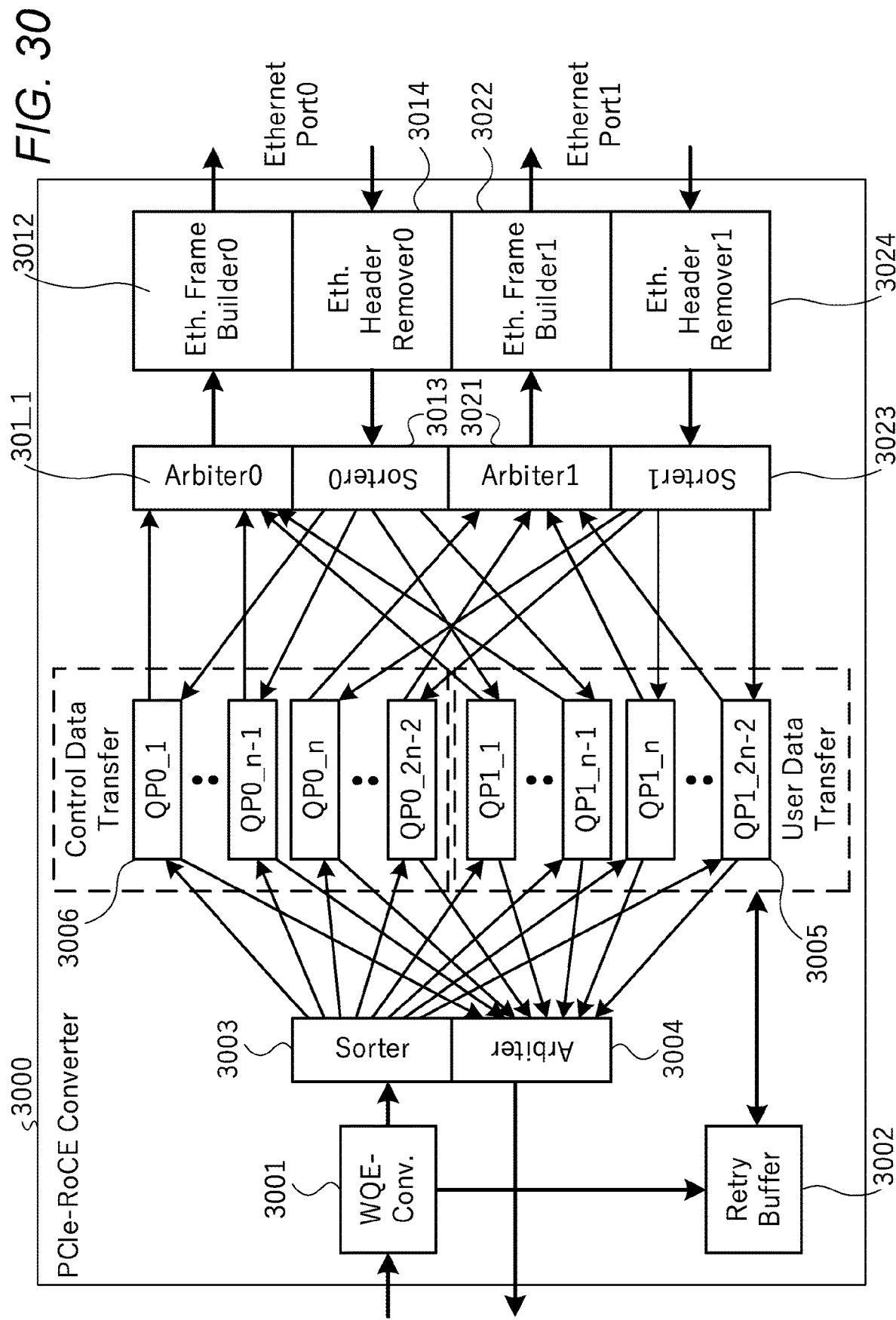
FIG. 30 is a diagram for explaining a configuration of an edge interface in the storage apparatus of a second embodiment.

FIG. 30 is a diagram for explaining a configuration of a PCIe-RoCE converter 3000 according to the second embodiment. The PCIe-RoCE converter 3000 includes a WQE converter 3001, a retry buffer 3002, sorters 3003, 3013, and 3023, arbiters 3004, 3011, and 3021, a plurality of QPs 3005, a plurality of QPs 3006, Ethernet frame builders 3012 and 3022, and Ethernet header removers 3014 and 3024. The plurality of QPs 3005 are surrounded by a broken line, and one QP is indicated by a reference sign as an example. The plurality of QPs 3006 are surrounded by a broken line, and one QP is indicated by a reference sign as an example.

The WQE converter 3001 converts the PCIe request received from the PCIe-EIF logic unit 302 into a work queue element (WQE) of the RoCE and sends the WQE to the sorter 3003. When receiving the PCIe completion from the PCIe-EIF logic unit 302, the WQE converter 3001 sends the PCIe completion as it is to the sorter 3003 without converting the PCIe completion. When receiving a PCIe Write request for user data transfer, the WQE converter 3001 stores the user data included in the payload in the retry buffer 3002. Further, when receiving a PCIe Write request for control data transfer, the WQE converter 3001 stores send data included in the payload in the WQE and sends the send data to the sorter 3003. Details of the processing of the WQE converter 3001 will be described later.

When the WQE received from the WQE converter 3001 is for user data transfer, the sorter 3003 sorts the WQE to any one of the QPs 3005 of QP1_1 to QP1_2n-2 according to the QP number specified in the WQE. When the WQE received from the WQE converter 3001 is for control data transfer, the sorter 3003 sorts the WQE to any one of QPs 3006 of QP0_1 to QP0_2n-2 according to the QP number specified in the WQE.

When receiving the PCIe completion, the sorter 3003 sorts the PCIe completion to any QP 3005 of QP1_1 to QP1_2n-2 or any QP 3006 of QP0_1 to QP0_2n-2 according to the requestor ID in the header.

The QPs 3005 and 3006 convert the WQE or PCIe completion into transport layer packets of the RoCE and send the transport layer packets to the arbiters 3011 and 3021. The QPs 3005 and 3006 are responsible for re-send control in the RoCE transport layer. When re-sending the user data, the QP 3005 reads the data to be re-sent from the retry buffer 3002. When re-sending the control data, the QP 3006 acquires the data to be re-sent from the WQE stored in the send queue 1706. In a case where the number of connection destination controllers is n−1 at maximum, the PCIe-RoCE converter 3000 includes 4n-4 QPs in total including 2n-2 QPs for user data transfer and 2n-2 QPs for control data transfer.

The arbiters 3011 and 3021 send the RoCE transport layer packets received from the QPs 3005 and 3006 to the Ethernet frame builders 3012 and 3022, respectively.

The Ethernet frame builders 3012 and 3022 add an Ethernet header, an IP header, a UDP header, and an FCS to the RoCE transport layer packets received from the arbiters 3011 and 3021, assemble an Ethernet frame, and send the Ethernet frame from an Ethernet port to an internal network.

The Ethernet header removers 3014 and 3024 removes the Ethernet header, the IP header, the UDP header, and the FCS from the Ethernet frame received from the internal network via the Ethernet port, and send the obtained RoCE transport layer packet to the sorters 3013 and 3023.

The sorters 3013 and 3023 sort the RoCE transport layer packets received from the Ethernet header removers 3014 and 3024 into any QP 3005 of QP1_1 to QP1_2n-2 or any QP 3006 of QP0_1 to QP0_2n-2 according to the QP number in the header.

The QPs 3005 and 3006 convert the RoCE transport layer packets received from the sorters 3013 and 3023 into PCIe packets and send the PCIe packets to the arbiter 3004.

The arbiter 3004 sends the PCIe packets received from the QPs 3005 and 3006 to the PCIe-EIF logic unit 302.

Figure 31:
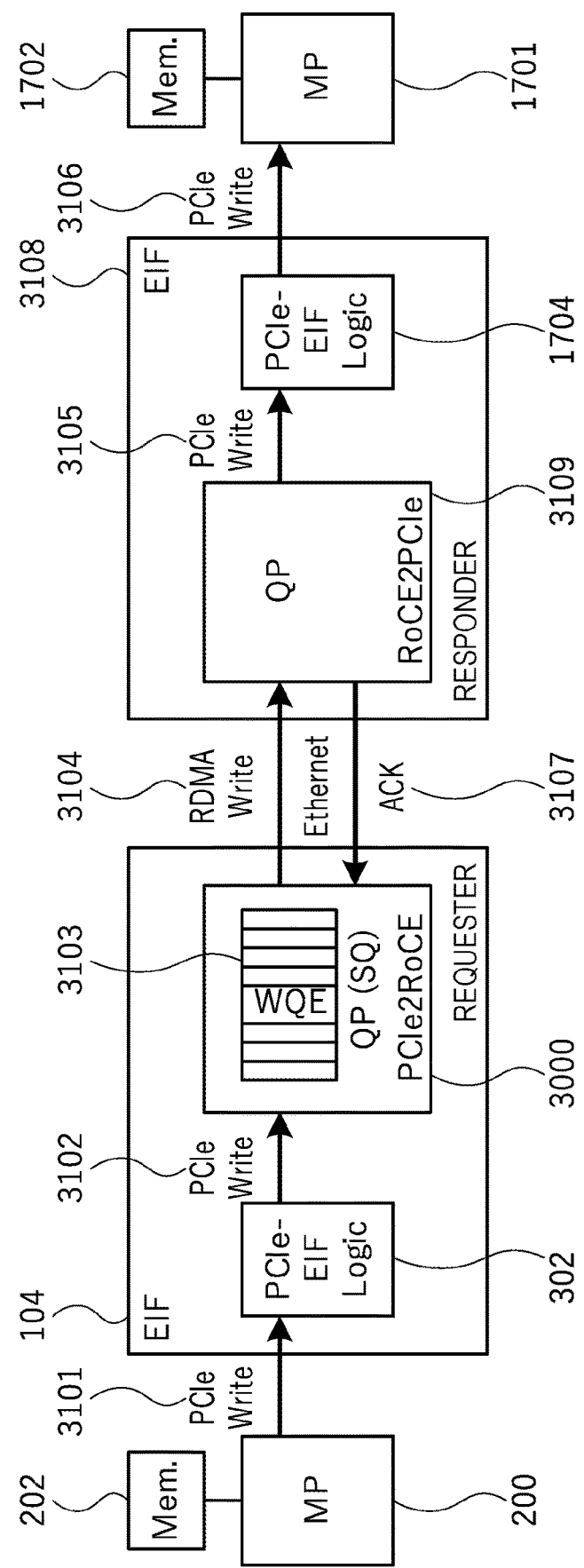
FIG. 31 is a diagram for explaining an operation of converting a PCIe Write request into an RDMA Write request in the storage apparatus of the second embodiment.

FIG. 31 is a diagram for explaining an operation in which the PCIe-RoCE converter converts a PCIe Write request for control data transfer into an RDMA Write request in the storage apparatus according to the second embodiment. As an example, a case where the processor 200 sends data in the memory 202 to a memory 1702 connected to a processor 1701 will be described. The processor 200 and the processor 1701 are connected via two EIFs 104 and 3108. The Ethernet switch and the Ethernet link connecting the EIF 104 and the EIF 3108 are omitted.

First, the processor 200 instructs the PCIe-EIF logic unit 302 to write data from the memory 202 to the memory 1702 by sending a PCIe Write request 3101 for control data transfer. The payload of the PCIe Write request 3101 includes send data.

The PCIe-EIF logic unit 302 sends a PCIe Write request 3102 in which send data in the memory 202 is stored in a payload to the PCIe-RoCE converter 3000. The PCIe-RoCE converter 3000 converts the received PCIe Write request into a WQE and posts the WQE in a send queue 3103. Then, after processing the WQE, the PCIe-RoCE converter 3000 sends an RDMA Write Request 3104 including send data to the internal network (Ethernet). Here, the PCIe-RoCE converter 3000 operates as an RoCE requestor. In the control data transfer, the PCIe-RoCE converter 3000 does not store the send data in the retry buffer 3002 but stores the send data in the WQE in the send queue 3103.

The EIF 3108 includes the PCIe-EIF logic unit 1704 and a PCIe-RoCE converter 3109. The PCIe-RoCE converter 3109 converts the RDMA Write request 3104 received via the internal network (Ethernet) into a PCIe Write request 3105 and sends the PCIe Write request to the PCIe-EIF logic unit 1704. Here, the PCIe-RoCE converter 3109 operates as a RoCE responder. The PCIe-RoCE converter 1705 that has sent the PCIe Write request 3105 sends the ACK 3107 to the PCIe-RoCE converter 3000 that is a requestor.

The PCIe-EIF logic unit 1704 sends the received PCIe Write request 3105 to the processor 1701 as a PCIe Write request 3106. Upon receiving the PCIe Write request 3106, the processor 1701 writes the data stored in the payload to the memory 1702.

Figures 32, 33:
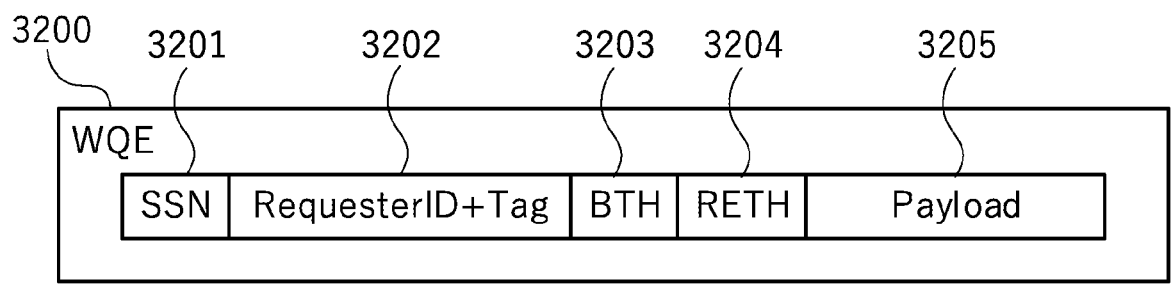
FIG. 32 is a diagram for explaining a content of a WQE for RDMA Write for control data transfer in the storage apparatus of the second embodiment.
FIG. 33 is a diagram for explaining a requestor ID-data transfer type management table in the storage apparatus of the second embodiment.

FIG. 32 is a diagram for explaining the WQE contents of the RDMA Write request converted from the PCIe Write request for control data transfer by the WQE converter 3001 of the PCIe-RoCE converter 3000 in the storage apparatus according to the second embodiment. A WQE 3200 includes an SSN (Send Sequence Number) 3201, a requestor ID and a Tag 3202 of the conversion source PCIe Write request, a BTH 3203 and a RETH 3204 of the conversion destination RDMA Write request, and a payload 3205 of the conversion source PCIe Write request. The payload 3205 includes send data.

FIG. 33 illustrates a requestor ID-data transfer type management table 3300 included in the WQE converter 3001 of the PCIe-RoCE converter 3000 in the storage apparatus according to the second embodiment. The requestor ID-data transfer type management table 3300 stores a source requestor ID 3301 and a data transfer type 3302 of the PCIe request received by the WQE converter 3001.

The data transfer type 3302 is information indicating control data transfer or user data transfer. In the storage apparatus according to the second embodiment, the control data and the user data are sent by another PCIe device having a different requestor ID. The WQE converter 3001 can determine whether the received PCIe request is for control data transfer or user data transfer by referring to this table.

Figure 34:
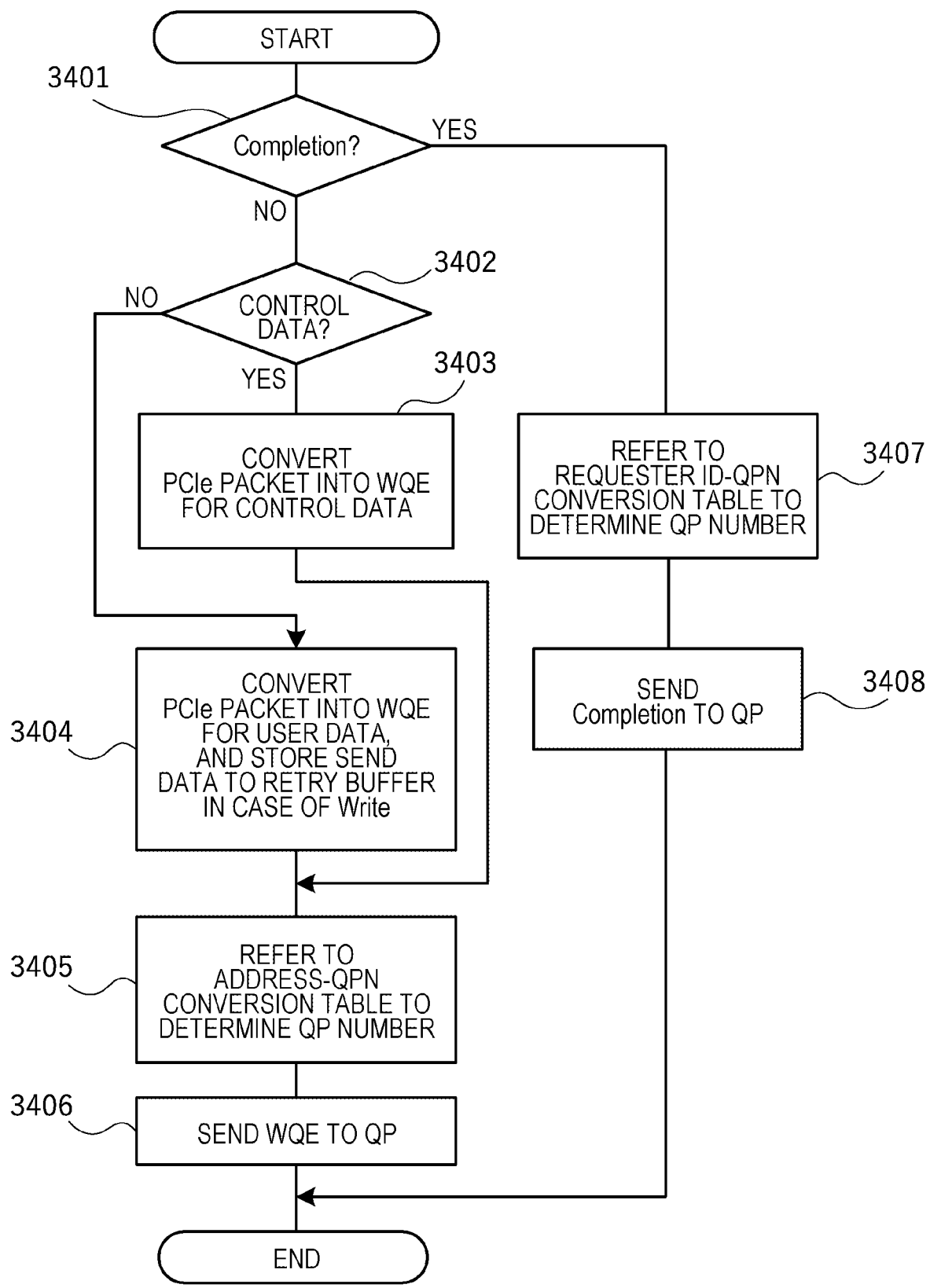
FIG. 34 is a diagram for explaining a processing flow of the WQE converter in the storage apparatus of the second embodiment.

FIG. 34 is a diagram for explaining a flowchart of an exemplary processing executed by the WQE converter 3001 of the PCIe-RoCE converter 3000 in the storage apparatus according to the second embodiment.

In Step 3401, the WQE converter 3001 determines whether the packet received from the PCIe-EIF logic unit 302 is a PCIe request or PCIe completion. When the received packet is a PCIe request, the process proceeds to Step 3402, and when the received packet is a PCIe completion, the process proceeds to Step 3407.

In Step 3402, the WQE converter 3001 refers to the requestor ID-data transfer type management table 3300, and determines whether the request is for control data transfer or user data transfer according to the requestor ID of the received PCIe request. When the received PCIe request is for control data transfer, the process proceeds to Step 3403, and when the received PCIe request is for user data transfer, the process proceeds to Step 3404.

In Step 3403, the WQE converter 3001 converts the PCIe request into the WQE for control data transfer.

In Step 3404, the WQE converter 3001 converts the PCIe request into the WQE for user data transfer. When the PCIe request is a PCIe Write, the WQE converter 3001 stores the send data included in the payload in the retry buffer 3002.

In Step 3405, the WQE converter 3001 identifies the source QP number with reference to the address-QP number conversion table 500.

In Step 3406, the WQE converter 3001 sends the WQE via the sorter 3003 to the QPs 3005 and 3006 of the identified numbers.

In Step 3407, the WQE converter 3001 identifies the source QP number with reference to the requestor ID-QP number conversion table 600.

In Step 3408, the WQE converter 3001 sends the PCIe completion the QPs 3005 and 3006 of the identified numbers via the sorter 3003.

In the storage apparatus according to the second embodiment, the operation of converting the PCIe Read request for control data transfer and the PCIe Read request for user data transfer into the RDMA Read request by the PCIe-RoCE converter 3000 is similar to that of the storage apparatus according to the first embodiment, and thus, the description thereof will be omitted.

As described above, when sending the control data, the storage apparatus according to the second embodiment stores the send data 3205 in the WQE 3200. Therefore, when the QP 3006 processes the WQE in the send queue 3103, it is not necessary to read the send data from the retry buffer 3002. Therefore, the storage apparatus according to the second embodiment can shorten the time for reading from the retry buffer 3002 in sending of control data transfer.

For example, as described with reference to FIGS. 33 and 34, the edge interface may determine whether to store the send data in the buffer or the send queue on the basis of the requestor ID of the PCIe request. The requestor ID is identification information indicating a source device of the PCIe request. For example, as described with reference to FIG. 30, the edge interface may include a QP that reads the send data from the buffer and a QP that stores the send data in the send queue together with the identification information of the RDMA request.

Third Embodiment

A storage apparatus according to a third embodiment will be described with reference to FIGS. 35 to 37. Since other configurations of the storage apparatus of the third embodiment are similar to those of the storage apparatus of the first embodiment, the description thereof will be omitted.

The storage apparatus stores the user data in the memories of the two controllers for high reliability. In this case, in the storage apparatus of the first embodiment, the PCIe-EIF logic unit 302 sends a total of two PCIe Write requests in which the same send data is stored in payloads to two controllers. As a result, the PCIe-RoCE converter 301 stores the send data included in the two PCIe Write requests in the retry buffer 402. That is, the retry buffer capacity for two pieces of send data is required. In the storage apparatus according to the third embodiment, a conversion method between the PCIe Write request and the RDMA Write request of the RoCE particularly suitable for reducing the capacity of the retry buffer will be described.

Figure 35:
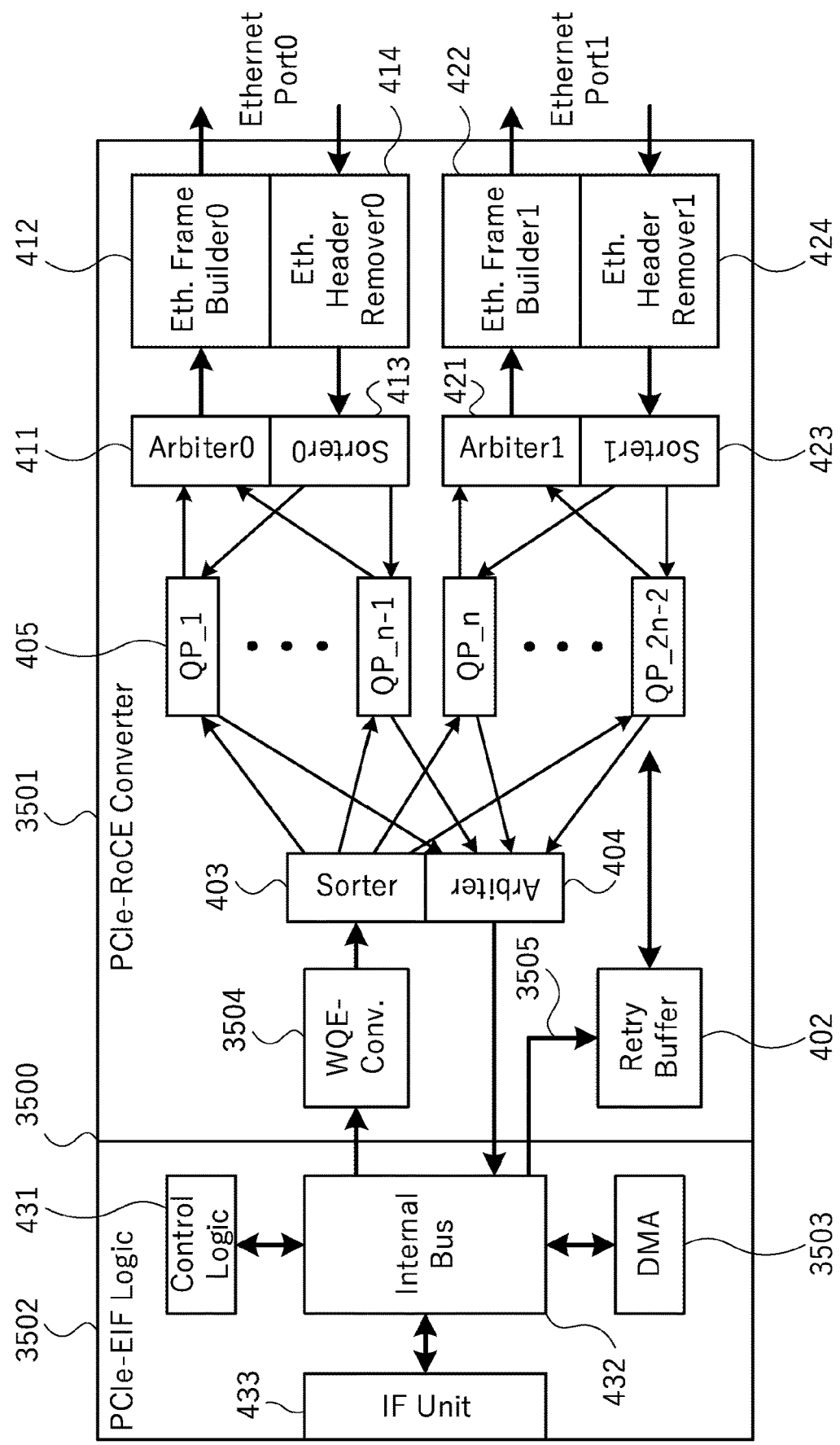
FIG. 35 is a diagram for explaining a configuration of an edge interface in the storage apparatus of a third embodiment.

FIG. 35 is a diagram for explaining a configuration of an edge interface 3500 according to the third embodiment. The edge interface 3500 includes a PCIe-EIF logic unit 3502 and a PCIe-RoCE converter 3501. The edge interface 3500 is different from the edge interface 104 of the first embodiment in the operation of storing the send data in the retry buffer 402. A DMA 3503 stores send data to another node without passing through a WQE converter 3504 in the retry buffer 402 (3505).

Figure 36:
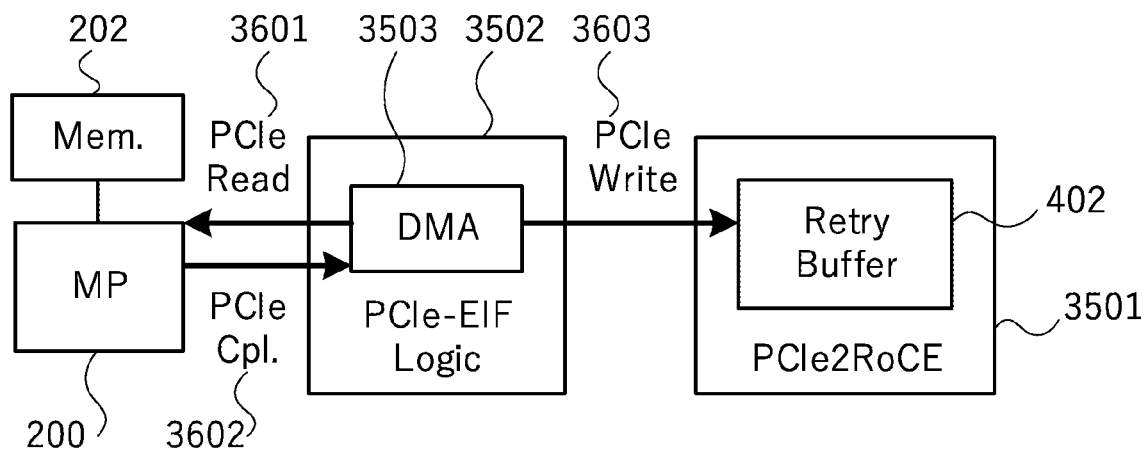
FIG. 36 is a diagram for explaining a write operation to the retry buffer in the storage apparatus of the third embodiment.

FIG. 36 is a diagram for explaining an operation of writing send data to the retry buffer 402 in the storage apparatus of the third embodiment. In FIG. 36, the DMA 3503 of the PCIe-EIF logic unit 3502 sends a PCIe Read request 3601 to the processor 200 and receives a PCIe completion 3602 in response to the PCIe Read request, thereby reading send data from the memory 202. The PCIe-EIF logic unit 3502 sends the send data to the PCIe-RoCE converter 3501 in a PCIe Write request 3603. The PCIe-RoCE converter 3501 stores the send data included in the payload of the PCIe Write request in the retry buffer 402.

Figure 37:
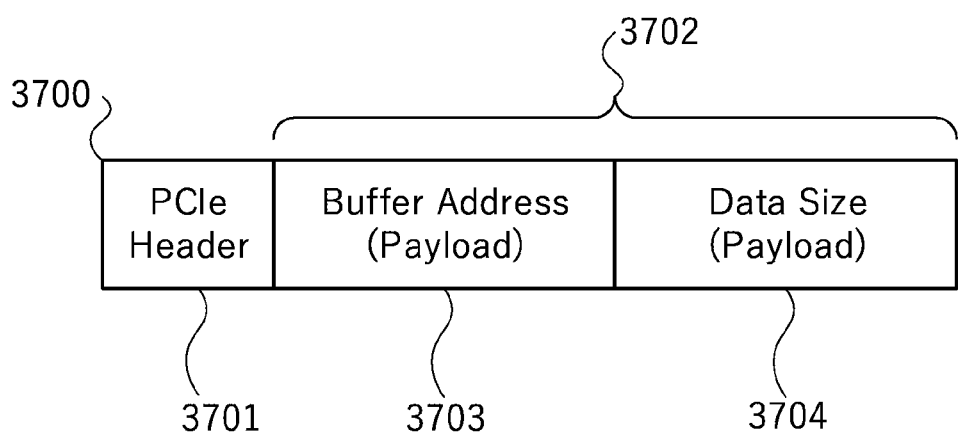
FIG. 37 is a diagram for explaining a PCIe Write request received by the WQE converter in the storage apparatus of the third embodiment.

FIG. 37 is a diagram for explaining a PCIe Write request packet 3700 sent to the WQE converter 3504 when the DMA 3503 transfers the user data in the storage apparatus according to the third embodiment.

The PCIe Write request packet 3700 includes a PCIe request header 3701 and a payload 3702. The payload 3702 includes a buffer address 3703 of the retry buffer 402 that stores the send data, and a data size 3704 of the send data.

The WQE converter converts the PCIe Write request packet 3700 into a WQE 1800 for user data transfer based on the buffer address 3703 stored in the payload 3702 and the data size 3704 of the send data.

As described above, in the storage apparatus according to the third embodiment, when a PCIe Write request is sent to another controller, first, the DMA 3503 of the PCIe-EIF logic unit 3502 sends re-send data to the retry buffer 402. Then, the DMA 3503 sends the PCIe Write request 3700 storing the retry buffer address 3703 of the send data storage destination and the send data size 3704 to the PCIe-RoCE converter 3501.

When the same user data is sent to two controllers, the DMA 3503 sends two PCIe Write requests 3700 not including the send data. As a result, even in a case where the user data is sent to the two controllers, the retry buffer capacity is consumed by only one user data, so that the retry buffer can be reduced in capacity.

For example, as described with reference to FIGS. 36 and 37, the edge interface may include an interface logic unit including a DMA that sends and receives PCIe packets, a converter that converts packets between PCIe and RoCE, and a buffer. The DMA may store the send data in the buffer, and send the PCIe request in which the buffer address of the send data storage destination and the send data size are stored to the converter.

The present invention is not limited to the embodiments described above, but includes various modifications. For example, the above-described embodiments have been described in detail in a clearly understandable way, and are not necessarily limited to those having all the described configurations. Some of the configurations of a certain embodiment may be replaced with the configurations of the other embodiments, and the configurations of the other embodiments may be added to the configurations of the subject embodiment. It is possible to add, delete, and replace other configurations for a part of the configuration of each embodiment.

Some or all of the configurations, functions, and processing units may be realized in hardware such as an integrated circuit. The configurations and the functions may be realized in software such that a processor analyzes and performs a program which realizes each function. Information such as a program, a table, and a file for realizing each function can be stored in a memory or a storage medium of a storage device such as a hard disk drive or a solid state drive.

The control lines and the information lines are illustrated which are considered as necessary for explanation, and it does not mean that all the control lines and the information lines are necessarily illustrated for a product. In practice, almost all the configurations may be connected to each other.

What is claimed is:

1. A storage apparatus including a plurality of storage controllers, wherein
each of the plurality of storage controllers includes a controller interface for connecting the storage controllers,
the controller interface includes one or more logical ports corresponding to each storage controller of a connection destination,
when converting a first request of a first protocol used in a storage controller into a second request of a second protocol used in an inter-storage controller network, the controller interface stores identification information of the first request and identification information of the second request in a send queue of the logical port,
wherein the identification information of the first request includes identification information of a source device of the first request and a packet identification number of the first request, and the identification information of the second request includes a packet identification number of the second request, and
wherein the controller interface stores information on a correspondence relationship between destination information of the first request and identification information of the logical port.

2. The storage apparatus according to claim 1, wherein
the controller interface includes a buffer; and
the controller interface determines whether to store send data in the buffer or the send queue based on identification information of a source device of the first request.

3. The storage apparatus according to claim 2, wherein
the controller interface includes a logical port that reads the send data from the buffer, and a logical port that stores the send data in a send queue together with identification information of the second request.

4. The storage apparatus according to claim 1, wherein
when converting a first response of the first protocol that is an execution result of the reading into a second response of the second protocol, the controller interface of the storage controller that has received the second request that is a read request stores a status of the execution result of the reading in a header of the second response and sends the second response.

5. The storage apparatus according to claim 1, wherein
the controller interface further stores information on a correspondence relationship between identification information of the logical port and address information of the logical port in the first protocol, wherein the address information of the logical port is an address information of the first protocol for routing within the controller interface.

6. The storage apparatus according to claim 1, wherein
when converting the second request into a third request of the first protocol, the controller interface of the storage controller that has received the second request that is a read request stores information on a correspondence relationship among identification information of the logical port that has received the second request, identification information of the second request, and identification information of the third request, and wherein the controller interface stores the correspondence of the identification information between the different protocols, the first request used within the storage controller and the second request used in the inter-storage controller network.

7. The storage apparatus according to claim 1, wherein the controller interface includes:
an interface logic unit that includes a DMA that sends and receives a packet of the first protocol;
a converter that converts a packet between the first protocol and the second protocol; and
a buffer, wherein
the DMA stores send data in the buffer, and sends a request of the first protocol in which a storage destination buffer address of the send data and a size of the send data are stored to the converter.

8. A protocol conversion method executed by a storage apparatus, wherein
the storage apparatus includes a plurality of storage controllers,
each of the plurality of storage controllers includes a controller interface for connecting the storage controllers,
the controller interface includes one or more logical ports corresponding to each storage controller of a connection destination, and
in the protocol conversion method, when a first request of a first protocol used in a storage controller is converted into a second request of a second protocol used in an inter-storage controller network, identification information of the first request and identification information of the second request are stored in a send queue of the logical port,
wherein the identification information of the first request includes identification information of a source device of the first request and a packet identification number of the first request, and the identification information of the second request includes a packet identification number of the second request, and
wherein the controller interface stores information on a correspondence relationship between destination information of the first request and identification information of the logical port.

9. The protocol conversion method according to claim 8, wherein
the logical port is selected with reference to a correspondence relationship between destination information of the first request and identification information of the logical port stored in the controller interface.

10. The protocol conversion method according to claim 8, wherein
the controller interface includes a buffer, and
in the protocol conversion method,
a logical port for reading send data from the buffer or a logical port for storing the send data in a send queue together with identification information of the second request is selected based on identification information of a source device of the first request.

11. The protocol conversion method according to claim 8, wherein
the first request is a read request, and
when a first response of the first protocol that is an execution result of the reading is converted into a second response of the second protocol, a status of the execution result of the reading is stored in a header of the second response and sent.

12. The protocol conversion method according to claim 9, wherein
identification information of the first request is sent to an address of the logical port selected by referring to a correspondence relationship between identification information of the logical port and address information of the logical port in the first protocol.

* * * * *